United States Patent [19]

Honsho et al.

[11] Patent Number: 6,125,001

[45] Date of Patent: Sep. 26, 2000

[54] METHOD AND APPARATUS FOR RECORDING DIGITAL SIGNAL AND DRUM UNIT FOR RECORDING FM AUDIO SIGNAL AND DIGITAL SIGNAL

[75] Inventors: Hironori Honsho, Himeji; Kaoru Matsuoka, Osaka; Yoshihiro Ueno, Kyoto, all of Japan

[73] Assignee: Matsushita Electric Industrial Co., Ltd., Osaka, Japan

[21] Appl. No.: 08/903,681

[22] Filed: Jul. 31, 1997

Related U.S. Application Data

[62] Division of application No. 08/625,339, Apr. 1, 1996, Pat. No. 5,949,598.

[30] Foreign Application Priority Data

Apr. 4, 1997 [JP] Japan ......................... 7-78727

[51] Int. Cl.$^7$ .............................. G11B 5/09; G11B 5/008
[52] U.S. Cl. ........................ 360/84; 360/19.1; 360/48; 360/61; 360/121
[58] Field of Search ............................... 360/18, 19.1, 48, 360/84; 386/40, 46, 75, 81

[56] References Cited

U.S. PATENT DOCUMENTS

| | | | |
|---|---|---|---|
| 4,591,924 | 5/1986 | Miura et al. | 358/330 |
| 4,633,332 | 12/1986 | Higurashi et al. | 360/10.3 |
| 4,654,724 | 3/1987 | Nagano | 358/310 |
| 4,660,104 | 4/1987 | Higurashi | 360/19.1 |
| 5,107,377 | 4/1992 | Ballard | 360/40 |
| 5,132,807 | 7/1992 | Takimoto et al. | 358/335 |
| 5,305,157 | 4/1994 | Wada et al. | 360/53 |
| 5,313,342 | 5/1994 | Soda et al. | 360/63 |
| 5,408,364 | 4/1995 | Watanabe et al. | 360/48 |
| 5,424,878 | 6/1995 | Rijckaert | 360/19.1 |
| 5,504,632 | 4/1996 | Kita et al. | 360/19.1 |
| 5,581,529 | 12/1996 | Roth et al. | 369/84 |
| 5,583,707 | 12/1996 | Seki | 360/48 |
| 5,646,795 | 7/1997 | Suzuki | 360/48 |
| 5,706,385 | 1/1998 | Suzuki et al. | 386/34 |
| 5,712,948 | 1/1998 | Yamada et al. | 386/95 |
| 5,751,504 | 5/1998 | Tanaka | 360/20 |
| 5,831,798 | 11/1998 | Muller et al. | 360/121 |

FOREIGN PATENT DOCUMENTS

| | | |
|---|---|---|
| 0267780 | 5/1988 | European Pat. Off. . |
| 0561281 | 9/1993 | European Pat. Off. . |
| 0639927 | 2/1995 | European Pat. Off. . |
| 58-060418 | 4/1983 | Japan . |
| 0087606 | 9/1983 | Japan . |
| 59-117353 | 6/1984 | Japan . |
| 60-206242 | 10/1985 | Japan . |
| 62-285551 | 11/1987 | Japan . |
| 2177062 | 7/1990 | Japan . |
| 330950 | 5/1991 | Japan . |
| 6318302 | 11/1994 | Japan . |

OTHER PUBLICATIONS

European Patent Search Report dated Aug. 2, 1996, for European Patent Application Serial No. 96105257.8.
European Patent Search Report dated Dec. 23, 1996, for European Patent Application Serial No. 96105257.8.

*Primary Examiner*—Jefferson Evans
*Attorney, Agent, or Firm*—Renner, Otto, Boisselle & Sklar LLP

[57] ABSTRACT

A digital signal recording method of the present invention for recording data divided into at least two segments in a recording track on a magnetic tape with a magnetic head mounted onto a rotational drum, includes the steps of: recording a first segment; recording a preamble having a length PR in a recording track direction so that the preamble is adjacent to a front edge of the first segment; recording a postamble having a length PO in the recording track direction so that the postamble is adjacent to a back edge of the first segment; and recording a second segment after the step of recording the first segment, wherein a relation PR=PO=G is substantially satisfied where "G" is a length of a gap in the recording track direction between the first segment and the segment.

3 Claims, 18 Drawing Sheets

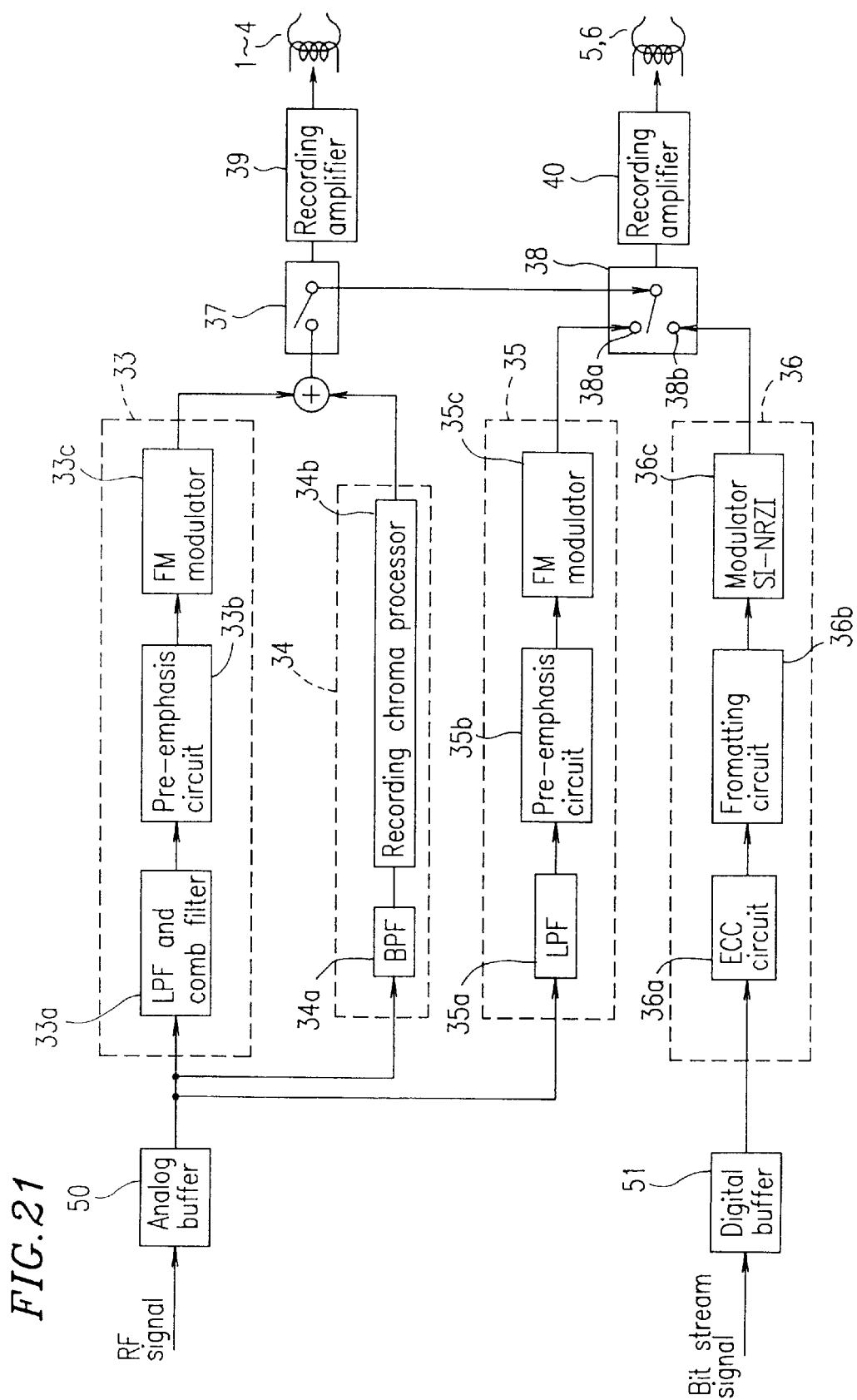

METHOD AND APPARATUS FOR RECORDING DIGITAL SIGNAL AND DRUM UNIT FOR RECORDING FM AUDIO SIGNAL AND DIGITAL SIGNAL

This is a division of application Ser. No. 08/625,339, filed Apr. 1, 1996, now U.S. Pat. No. 5,949,598.

BACKGROUND OF THE INVENTION

1. Field of the Invention

The present invention relates to a digital signal recording method in which a plurality of divided segments are independently edited in the same recording track, and a drum unit for recording an FM audio signal and a digital signal with the same head.

2. Description of the Related Art

Multi-channel satellite broadcasting service is now available in the United States. In such service, multi-channel broadcasting is realized by a digital compression technique for significantly compressing video signals or audio signals. Moreover, a bit rate is changed in accordance with the contents of a broadcasting program. For example, a low bit rate (for example, 3 Mbps) is used for movies or the like, and a high bit rate (for example, 6 Mbps) is used for live broadcasting programs or the like. The similar service is being planned to be provided in Japan and Europe by using a satellite, a ground wave or a cable.

In the case where such broadcasting programs are recorded by a digital video cassette recorder (hereinafter, abbreviated as VCR), a number of programs can be recorded onto one cassette tape. Therefore, it is required that information recorded onto the cassette tape can be more precisely retrieved at a higher speed. Furthermore, as original video libraries, subcode data regions for recording not only a signal for searching the beginning and a time code of video signals recorded onto the cassette tape, but also the simplified contents of the video signals are intended for use. However, these data regions are frequently overwritten after video images are recorded therein. Moreover, it should be ensured that data is read therefrom with high speed search.

Japanese Patent Publication No. 3-30950 discloses a technique regarding the overwriting of digital data. According to this technique, when the digital data is partially overwritten, the previously recorded data to be overwritten is prevented from being left unerased. In this technique, the digital data can be erased by overwriting the data with a preamble length and a postamble length which are determined in view of synchronizing the reproducing data using a phase locked loop (PLL) and a jitter amount of a VCR.

In such conventional preamble and postamble recording/overwriting, a large preamble amount and a large postamble amount are required to prevent the interface between overwritten edited data and unedited data in a track. Therefore, if the same preamble amount and postamble amount are provided for all various data having different forms recorded in a track, a recording area of data which is effective to a user is disadvantageously limited. More specifically, it is desirable to reduce a preamble region and a postamble region as small as possible so as to increase data storage capacity. As a result, however, an unnecessary signal region is formed.

Moreover, the conditions regarding a gap are not referred to in the conventional technique.

In addition, in order to obtain the compatibility with a conventional analog VCR, a head for analog video signals, a head for FM audio signals and a head for digital signals are required to be independently provided, resulting in the increased cost of a device.

SUMMARY OF THE INVENTION

The digital signal recording method of this invention for recording data divided into at least two segments in a recording track on a magnetic tape with a magnetic head mounted onto a rotational drum, includes the steps of: recording a first segment; recording a preamble having a length PR in a recording track direction so that the preamble is adjacent to a front edge of the first segment; recording a postamble having a length PO in the recording track direction so that the postamble is adjacent to a back edge of the first segment; and recording a second segment after the step of recording the first segment, wherein a relation PR=PO=G is substantially satisfied where "G" is a length of a gap in the recording track direction between the first segment and the second segment.

According to another aspect of the present invention, a digital signal recording method for recording data divided into at least two segments in a recording track on a magnetic tape with a magnetic head mounted onto a rotational drum, includes the steps of: recording a first segment as a unit of a first sync block containing data representing synchronous data, ID data, data for correcting an error and a digital signal; recording a preamble having a length $PR_1$ in a recording track direction so that the preamble is adjacent to a front edge of the first segment; recording a postamble having a length $PO_1$ in the recording track direction so that the postamble is adjacent to a back edge of the first segment; recording a second segment as a unit of a second sync block containing data representing synchronous data, ID data, data for correcting an error and a digital signal, prior to the step of recording the first segment; recording a preamble having a length $PR_2$ in the recording track direction so that the preamble is adjacent to a front edge of the second segment; and recording a postamble having a length $PO_2$ in the recording track direction so that the postamble is adjacent to a back edge of the second segment, wherein a relation $PR_1<PR_2$ and a relation $PO_1<PO_2$ are satisfied.

In one embodiment of the present invention, the data representing the digital data contained in the second sync block includes at least one of information for searching during high-speed search and time code information.

In another embodiment of the present invention, a length of the second sync block in the recording track direction is one-fourth or less of a length of the first sync block in the recording track direction.

In still another embodiment of the present invention, the first preamble has a length equal to or longer than positional deviation of a front edge of a recording track, which is formed by being helically scanned with the magnetic head.

In still another embodiment of the present invention, the synchronous data includes at least data for determining whether a signal is used for high-speed search or not.

In still another embodiment of the present invention, a relation $PR_2=PO_2=G$ is substantially satisfied where "G" is a length of gap in the recording track direction between the first segment and the second segment.

According to still another aspect of the present invention, a digital signal recording method for recording data divided into at least two segments in a recording track on a magnetic tape with a magnetic head mounted onto a rotational drum, includes the steps of: recording a first segment as a unit of a first sync block containing data representing synchronous data, ID data, data for correcting an error and a digital signal;

recording a preamble having a length $PR_1$ in a recording track direction so that the preamble is adjacent to a front edge of the first segment; recording a postamble having a length $PO_1$ in the recording track direction so that the postamble is adjacent to a back edge of the first segment; recording a second segment as a unit of a second sync block containing data representing synchronous data, ID data, data for correcting an error and a digital signal, prior to the step of recording the first segment; recording a preamble having a length $PR_2$ in the recording track direction so that the preamble is adjacent to a front edge of the second segment; and recording a postamble having a length $PO_2$ in the recording track direction so that the postamble is adjacent to a back edge of the second segment, wherein a relation $PR_1 < PO_1 < PR_2 = PO_2$ is satisfied.

According to still another aspect of the present invention, a drum unit for recording an FM audio signal/a digital signal, includes: a magnetic head for recording an FM audio signal at a first track pitch and recording a digital signal at a second track pitch in a recording track of a magnetic tape; a rotational drum on which the magnetic head is mounted; and a fixed drum for rotatably supporting the rotatable drum around a rotational axis, wherein a relation $H_w \leq 3\ P-2D$ is satisfied where "P" is the smaller track pitch of the first track pitch and the second track pitch, "D" is deviation of a scanning locus between a recording track recorded at the smaller track pitch P and the magnetic head, "$H_w$" is a head width of the magnetic head.

In one embodiment of the present invention, the head width $H_w$ of the magnetic head satisfies a relation $27\ \mu m \leq H_w \leq 32\ \mu m$.

According to still another aspect of the present invention, a digital signal recording apparatus for recording data divided into at least two segments in a recording track on a magnetic tape with a magnetic head mounted onto a rotational drum, comprising digital signal processing means for formatting a first segment, a second segment, a preamble having a length PR in a recording track direction, adjacent to a front edge of the first segment and a postamble having a length PO in the recording track direction, adjacent to a back edge of the second segment, wherein the digital signal processing means performs the formatting so as to substantially satisfy a relation $PR=PO=G$ where "G" is a length of a gap between the first segment and the second segment in the recording track.

According to still another aspect of the present invention, a digital signal recording apparatus includes: a magnetic head for recording an FM audio signal at a first track pitch and recording a digital signal at a second track pitch in a recording track of a magnetic tape; a rotational drum on which the magnetic head is mounted; and a fixed drum for rotatably supporting the rotatable drum around a rotational axis, wherein a relation $H_w \leq 3\ P-2D$ is satisfied where "P" is the smaller track pitch of the first track pitch and the second track pitch, "D" is deviation of a scanning locus between a recording track recorded at the smaller track pitch P and the magnetic head, "$H_w$" is a head width of the magnetic head.

Thus, the invention described herein makes possible the advantages of: (1) providing methods for recording/overwriting a digital signal, which are capable of preventing unnecessary data from being left unerased by the overwriting of data, preventing a detection error and a reproduction error of data in high-speed search and normal reproduction from being produced by lack of a necessary signal, and sufficiently preserving the data amount allowed to be written in a limited track; and (2) providing a drum unit and a magnetic recording/reproducing device at low cost in which a single head serves both for FM audio signals and digital signals.

These and other advantages of the present invention will become apparent to those skilled in the art upon reading and understanding the following detailed description with reference to the accompanying figures.

BRIEF DESCRIPTION OF THE DRAWINGS

FIG. 21 is a block diagram of the recording apparatus according to the present invention.

DESCRIPTION OF THE PREFERRED EMBODIMENTS

The present invention will now be described in detail with reference to the drawings, wherein like elements are referred to with like reference labels throughout.

Hereinafter, an example of a method for recording/overwriting digital signals, a drum unit and a magnetic recording/reproducing device, which are allowed to have reproduction compatibility with a tape on which data is recorded in a VHS format, will be described. In this specification, the word "ahead" indicates a relatively prior position when a head scans a track on a magnetic tape. For example, "data A" ahead of "data B" indicates that data A is retrieved by the head prior to retrieval of the data B. The word "behind" has opposite meaning of the word "ahead". Similar relation between the words "front" and "back" holds true in the specification.

Figure 1:
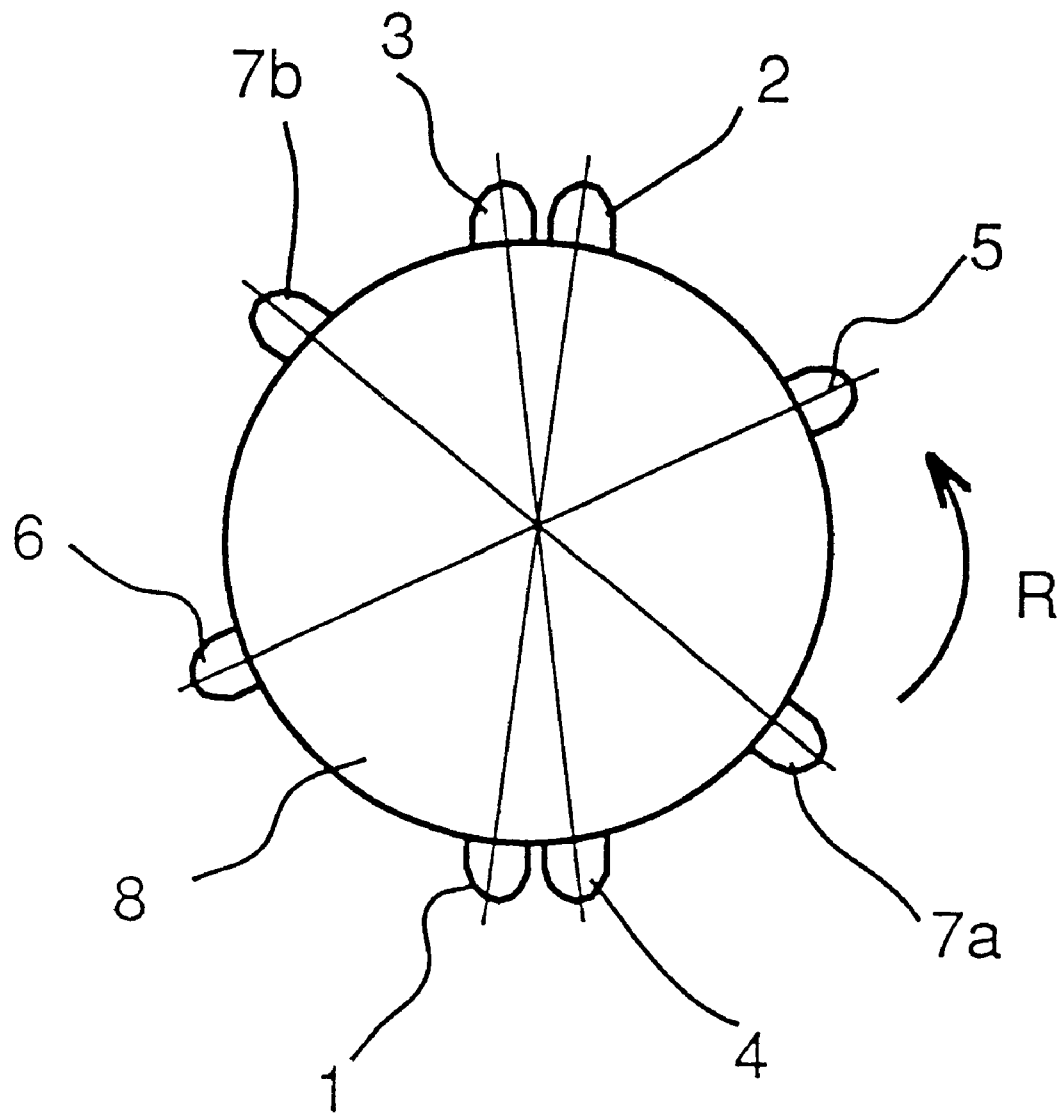
FIG. 1 is schematic view showing the arrangement of magnetic heads on a rotational drum according to Example 1 of the present invention.

FIG. 1 is a plan view showing the arrangement of magnetic heads on a rotational drum 8. The rotational drum 8 includes magnetic heads 1 and 2 for a standard playing (SP) mode, in which analog video signals are recorded and reproduced, and magnetic heads 3 and 4 for an extended playing (EP) mode. The magnetic heads 1 and 3 are attached to the rotational drum 8 at the positions so as to be opposed to the magnetic heads 2 and 4 at 180 degrees, respectively, on the circumference of the rotational drum. A magnetic head 5 for FM audio/digital signals has a function of recording/reproducing an FM audio signal and a function of recording/reproducing a digital signal. The magnetic head 5 is attached to the magnetic drum 8 at the position about 120 degrees ahead the magnetic heads 1 and 4 in a rotational direction R of the rotational drum 8. Similarly, a magnetic head 6 for FM audio/digital signals is attached to the magnetic drum 8 at the position about 120 degrees ahead the magnetic heads 2 and 3 for analog signals in the rotational direction R of the rotational drum 8. Furthermore, FE heads 7a and 7b for erasing data while editing the data by frames are attached to the magnetic drum 8.

Figure 2:
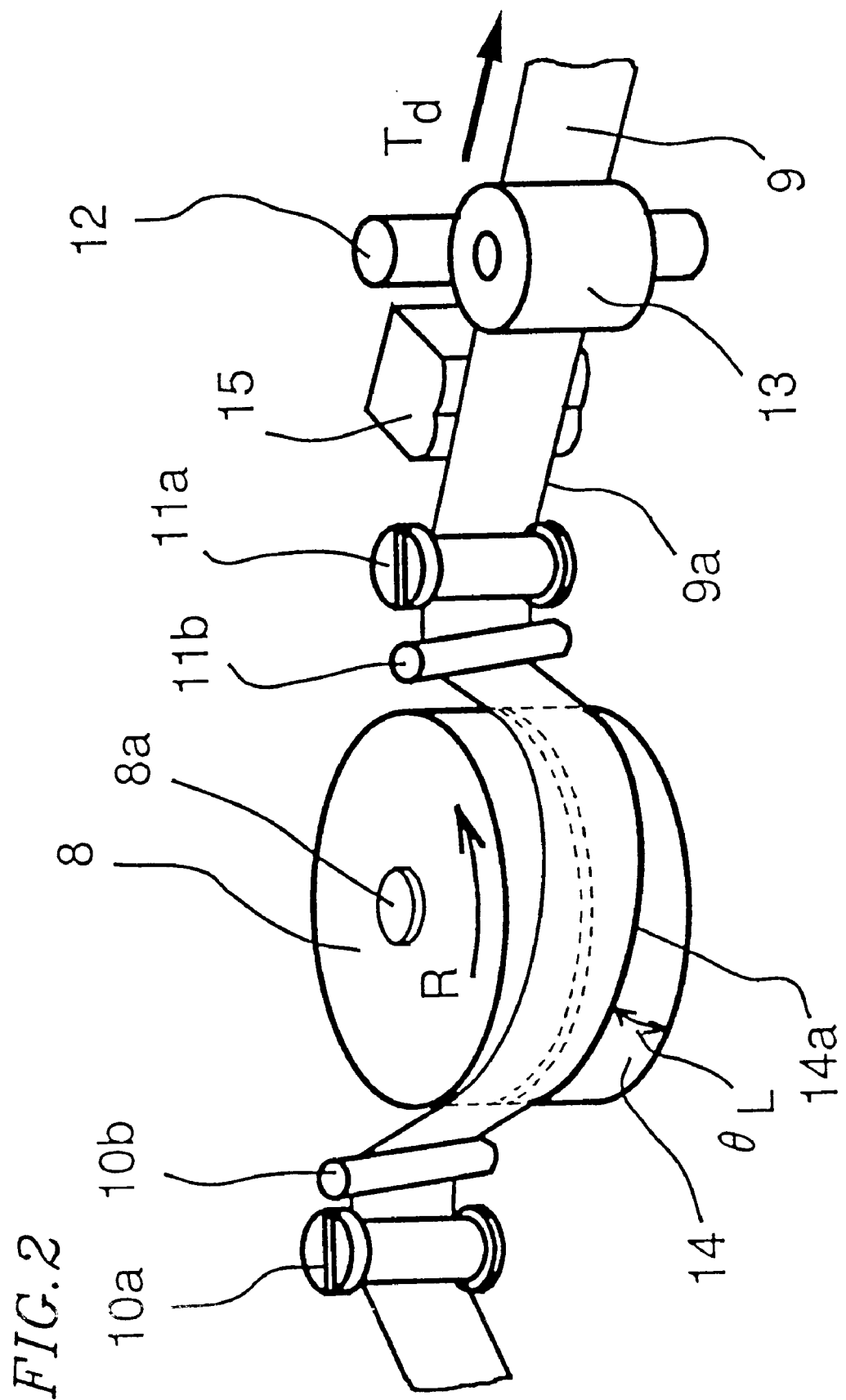
FIG. 2 is a perspective view showing a main part of a magnetic tape transporting system according to Example 1 of the present invention.

FIG. 2 is a perspective view showing the main part of a magnetic tape running system, illustrating the state where a magnetic tape 9 passes over the rotational drum 8 while partially being wound over a circumference of the rotational drum 8. The magnetic tape 9 is wound over the rotational drum 8 about 180 degrees by guide rollers 10a and 11a, and inclined posts 10b and 11b. Furthermore, the magnetic tape 9 is transported in the direction indicated with an arrow $T_d$ by a capstan 12 and a pinch roller 13. A fixed drum 14 is coaxially positioned on the same axis as that of the rotational drum 8, and guides a lower end 9a of the magnetic tape 9 with a lead 14a. Furthermore, the fixed drum 14 rotatably supports the rotational shaft 8a pressed into the rotational drum 8.

An A/C head 15 for recording/reproducing linear audio signals and control signals is placed between the capstan 12 and the guide roller 11a.

A lead angle $\theta_L$ of the lead 14a of the fixed drum 14 is 5.935388 degrees, and the rotational drum 8 having a diameter of about 62 mm rotates at about 30 rps. Therefore, in the case where the magnetic tape 9 is transported at a speed of 33.35 mm/s, the same head locus as that obtained in the SP mode of a VHS format is obtained. In the case where a the magnetic tape 9 is transported at a speed of 11.12 mm/s, the same head locus as that obtained in the EP mode of a VHS format is obtained.

In the recording mode using the heads 5 and 6 for FM audio/digital signals, a tape speed Vt is 16.675 mm/s, and the rotational drum 8 rotates at about 30 rps.

Figure 3:
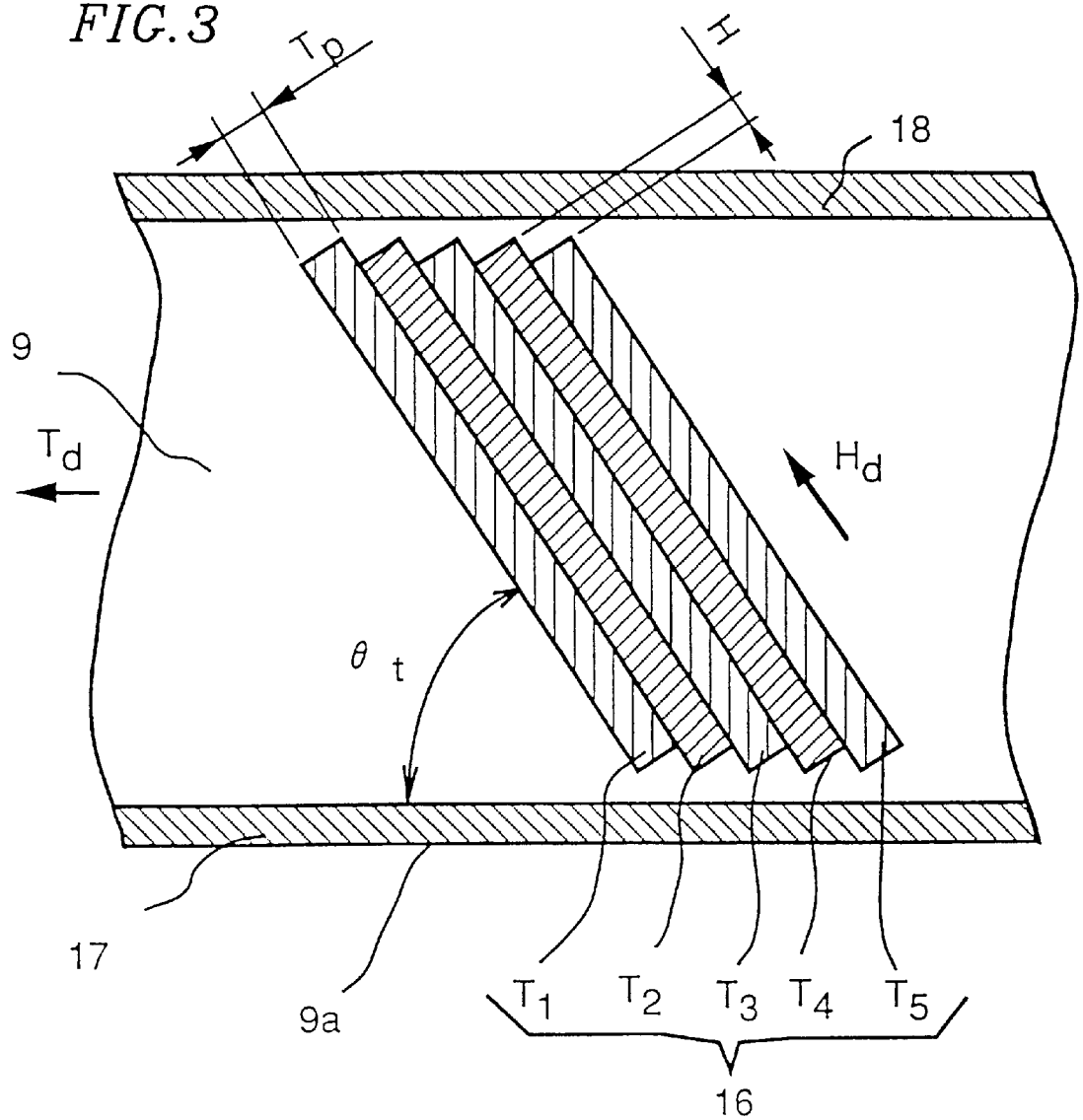
FIG. 3 is a view showing a track recording pattern on a magnetic tape according to Example 1 of the present invention.
Figure 4:
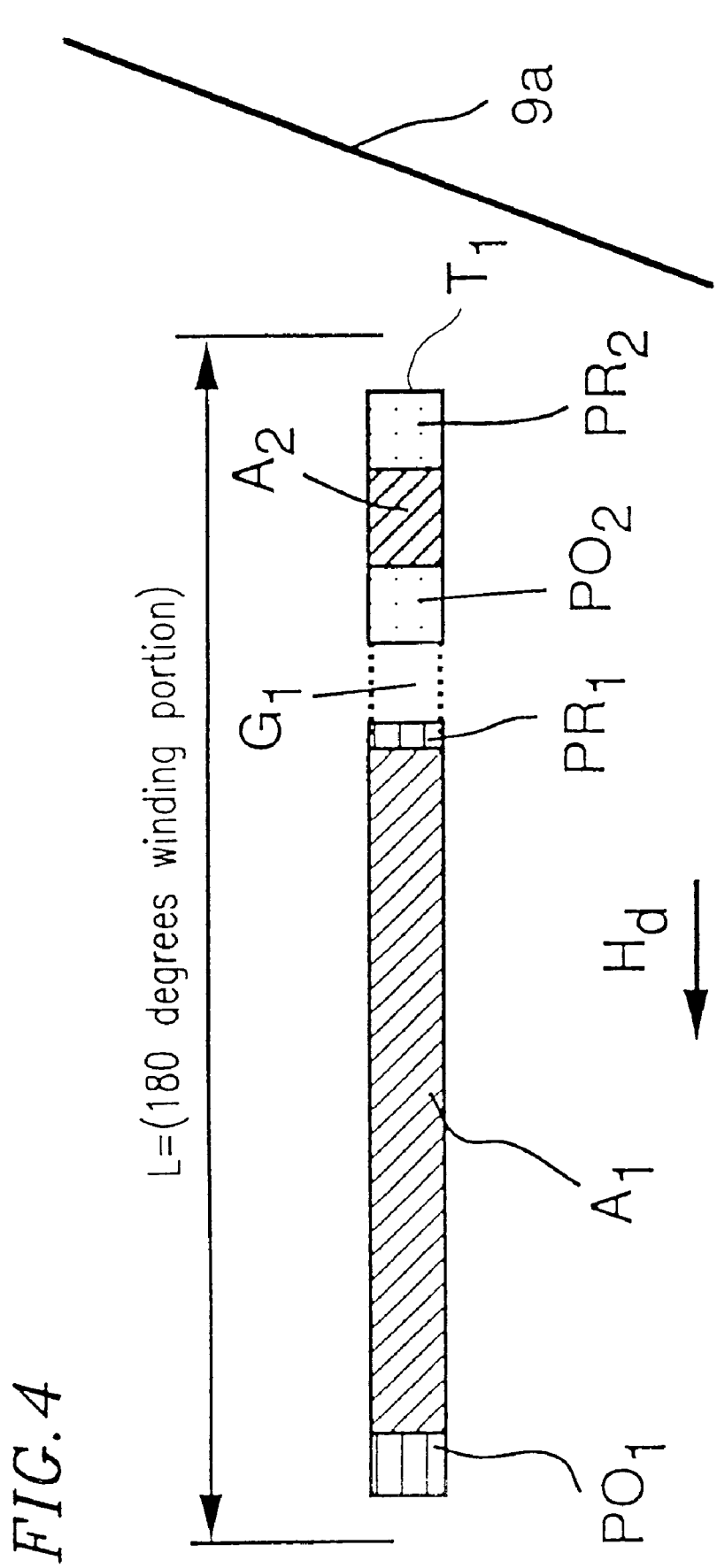
FIG. 4 is a view showing a recording pattern of one of the tracks on the magnetic tape shown in FIG. 3 according to Example 1 of the present invention.

FIG. 3 shows recording tracks of a digital signal viewed from the magnetic face of the magnetic tape 9, and FIG. 4 shows an enlarged view of a track $T_1$, taken from the tracks shown in FIG. 3.

In FIG. 3, tracks $T_1$, $T_3$, . . . etc. are successively formed on the magnetic tape 9 by the magnetic head 5 for FM audio/digital signals. Tracks $T_2$, $T_4$, . . . etc. are successively formed on the magnetic tape 9 by the magnetic head 6 for FM audio/digital signals. An arrow $H_d$ in FIG. 3 indicates a scanning direction of the magnetic heads 5 and 6. The thus formed tracks have a track pitch $T_P$ of 29 μm and a track angle $\theta_t$ of about 5.952 degrees. A track position deviation H of recording start positions and recording end positions in the adjacent tracks which are successively formed is about 280 μm in the tape running direction. A control signal 17 and a linear audio signal 18 are recorded on a lower end portion 9a and an upper end portion of the tape 9, respectively, by the A/C head 15.

FIG. 4 shows one of the tracks of FIG. 3, in which various pieces of information recorded therein are separately shown. From the lower end 9a of the magnetic tape 9, a preamble region $PR_2$, a segment region $A_2$, a postamble region $PO_2$, a gap region $G_1$, a preamble region $PR_1$, a segment region $A_1$ and a postamble region $PO_1$ are formed. Also in the tracks $T_2$, $T_3$, $T_4$ . . . etc., regions are formed in a similar arrangement.

Next, the data structures of the regions are described with reference to FIGS. 5 through 8, respectively.

Figure 5:
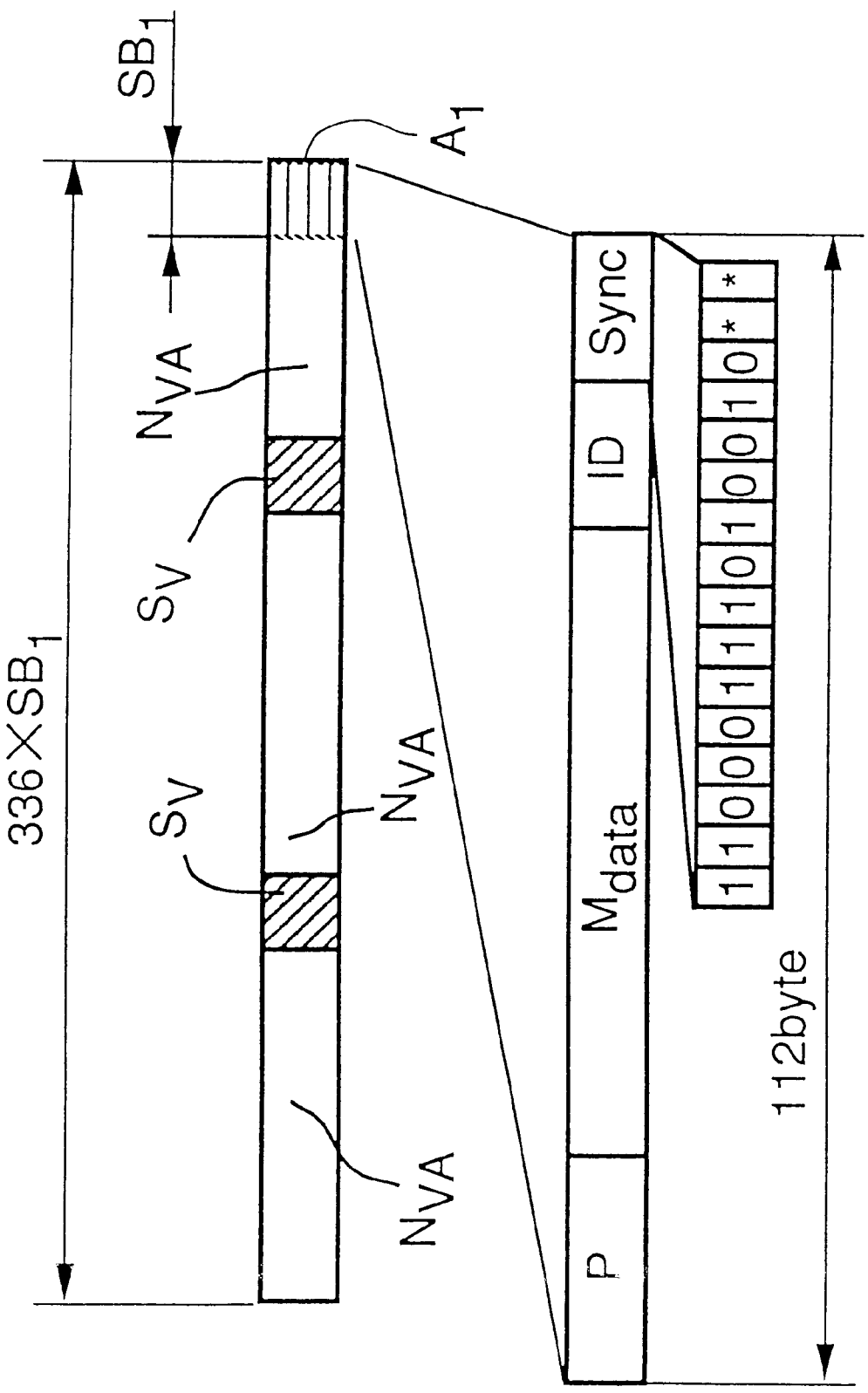
FIG. 5 shows the structure of data in a segment $A_1$ according to Example 1 of the present invention.

FIG. 5 shows the structure of the segment region $A_1$. The segment region $A_1$ comprising 336 sync blocks $SB_1$ (about 280 μm) each including 112 bytes. In each sync block $SB_1$, a block synchronization signal (Sync), an ID signal, main data ($M_{data}$) consisting of compressed video data and audio data, and parity data (P) for detecting an error, are positioned in this order from the beginning to the end of the block. The ID signal is used for indicating a track address representing a position in which each sync block $SB_1$ is located, or a block address for error correction representing a position in which data consisting of a plurality of blocks is located. The data in the segment $A_1$ includes $N_{VA}$ portions, each consisting of video data and audio data for normal reproduction, and signal portions $S_V$ for video signals for searching operations at about several tens of times of normal speed both in forward and reverse directions, at predetermined positions separated from each other. As shown in FIG. 5, the video signal portions $S_V$ for searching are placed at the positions away from both beginning portion and end portion of the segment $A_1$. Therefore, even in the case where data in the segment $A_1$ is overwritten, the data in the signal portions $S_{V1}$ is prevented from being left unerased owing to the above structure.

Figure 6:
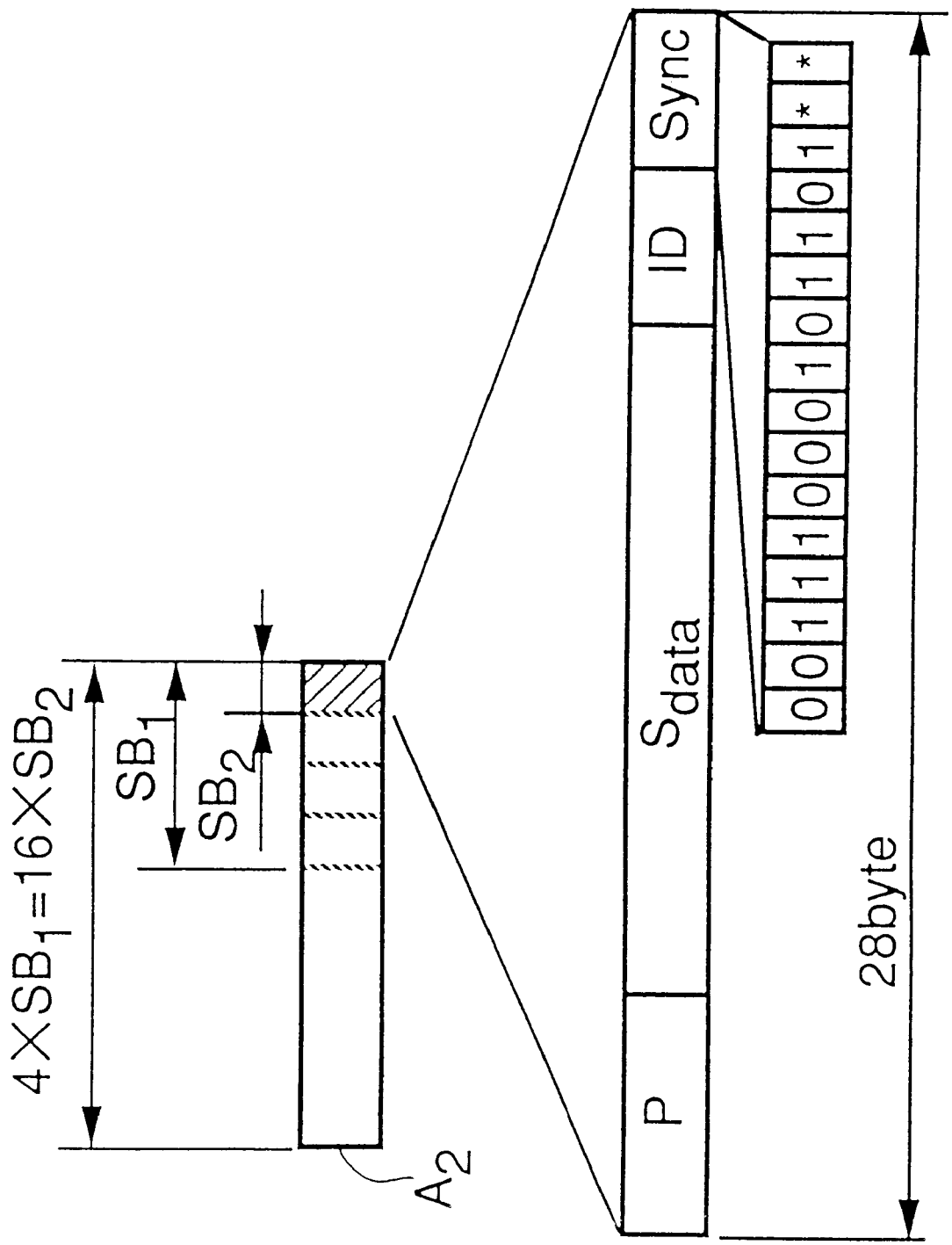
FIG. 6 shows the structure of data in a segment $A_2$ according to Example 1 of the present invention.

FIG. 6 shows the segment region $A_2$ comprising 16 sync blocks $SB_2$ (about 70 μm) each including 28 bytes. In each sync block $SB_2$, a block synchronization signal (Sync), an ID signal, subcode data ($S_{data}$), which is used for editing or searching data, including a time code, a signal for searching and an index information of video data and audio data, and parity data (P) for detecting an error, are positioned in this order from the beginning to the end of the block. In this way, the minimum sync block $SB_2$ in the segment region $A_2$ consists of 28 bytes, which is about one-fourth the length of the sync block $SB_1$ in the segment region $A_1$. This is because a length of the sync block $SB_2$ is required to be short, i.e., about 70 µm or less, in order that the magnetic heads 5 and 6 for FM audio/digital signals scanning across the tracks ($T_1$, $T_2$, $T_3$ ...) read the subcode data ($S_{data}$) with certainty using a head width of 32 µm or less described below during a high-speed search of 100 times normal speed or higher speed.

Figure 7:
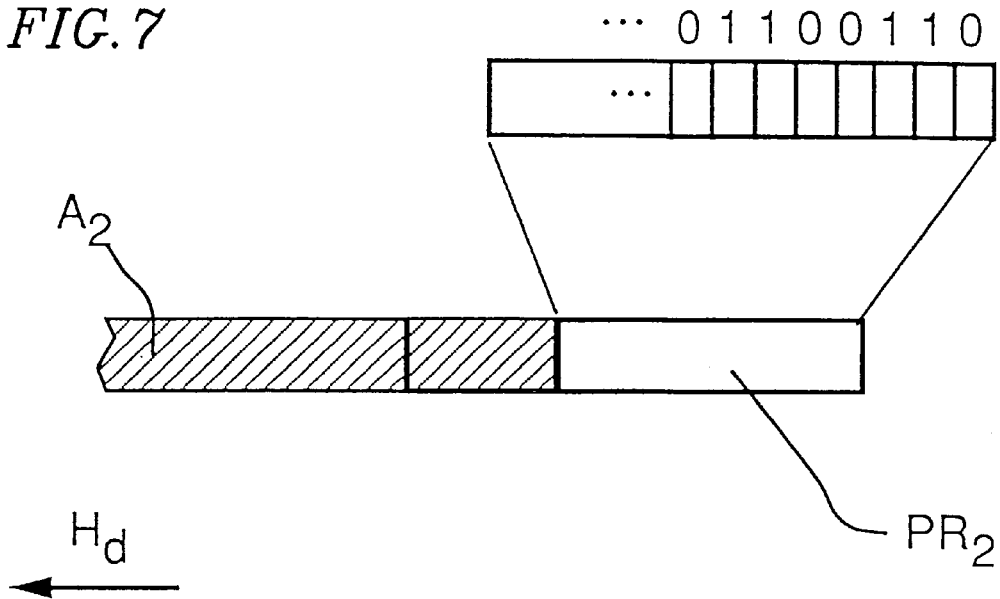
FIG. 7 shows the structure of data in a preamble according to Example 1 of the present invention.
Figure 8:
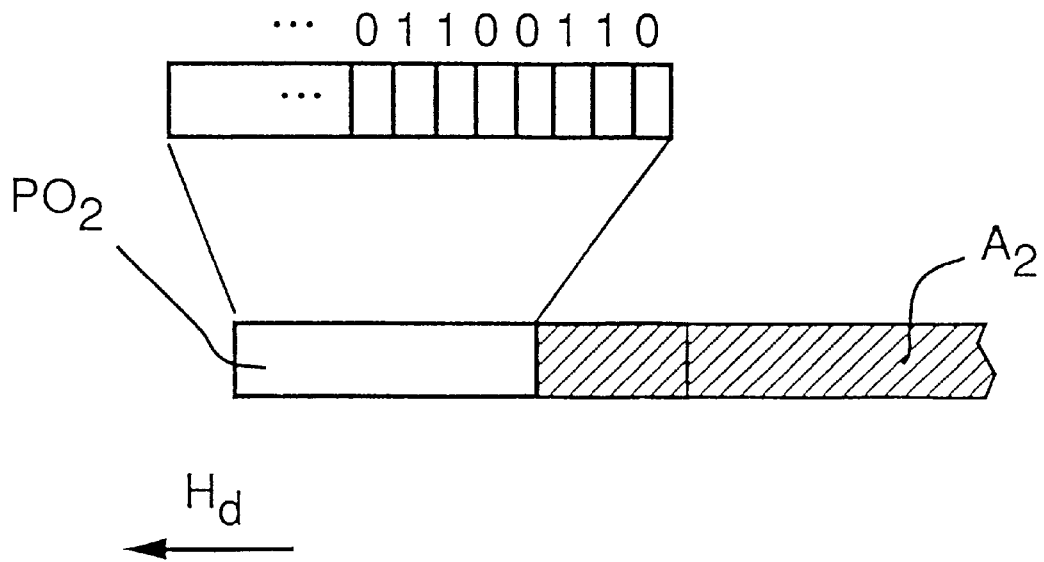
FIG. 8 shows the structure of data in a postamble according to Example 1 of the present invention.

FIG. 7 is a view showing the structure of the preamble region $PR_2$ which is added ahead of the segment region $A_2$. FIG. 8 similarly shows the structure of the postamble region $PO_2$ which is added behind the segment region $A_2$. Since the preamble region $PR_1$ and the postamble region $PO_1$ which are added ahead of and behind the segment region $A_1$, respectively, have the similar structure to those of the preamble region $PR_2$ and the postamble region $PO_2$, the description thereof is herein omitted.

The preamble region $PR_2$ consists of repeated specific patterns (each consisting of 8 bits: 01100110), thereby allowing a phase-locked loop to be easily synchronized with the reproduced data and ensuring the reading of data of the segment region $A_2$. At the position in the vicinity of the segment region $A_2$, signals consisting of the synchronization signal (Sync), an ID signal (ID) for identifying a region to which a preamble region or a postamble region belongs, and a parity signal (P). Owing to these signals, a position which is currently scanned by the head can be efficiently identified.

Moreover, in the synchronization signal portions of the respective segments $A_1$ and $A_2$, flag regions for determining whether a signal is to be reproduced or not in high-speed search retrieval are reserved, respectively. In this example, this determination is performed with a synchronization signal pattern. Specifically, the segment region $A_1$ has a pattern consisting of 16 bits: "01001011100011". The segment region $A_2$ has a pattern also consisting of 16 bits: "10110100011100", which is obtained by inverting the synchronization signal pattern of the segment pattern $A_1$. The first two bits indicated with "**" can be either "1" or "0".

The contents of data of the respective segment regions $A_1$ and $A_2$ having such data structures will be briefly described.

First, in the segment region $A_1$, the compressed video/audio signals as described above are separately recorded in the data portions $N_{VA}$ for normal reproduction and the data portions $S_V$ for search at relatively low speed (at about several tens of times normal speed).

Moreover, in the segment region $A_2$, a time code, a signal for searching an index signal for video data and audio data, which are used for edit and search are recorded.

Furthermore, all flags in the ID data of the data portions $S_V$ in the segment region $A_1$ and the sync blocks $SB_2$ in the segment regions $A_2$ are "1", so as to be determined as effective data during search.

Hereinafter, the functions of the preambles $PR_1$ and $PR_2$, the postambles $PO_1$ and $PO_2$ and the gap region $G_1$ which are added ahead of or behind the segment regions $A_1$ and $A_2$, respectively, will be described.

The preambles $PR_1$ and $PR_2$, the postambles $PO_1$ and $PO_2$ and the gap region $G_1$ are provided for precisely reading all data in the segment regions $A_1$ and $A_2$ which have been independently edited.

Figure 9:
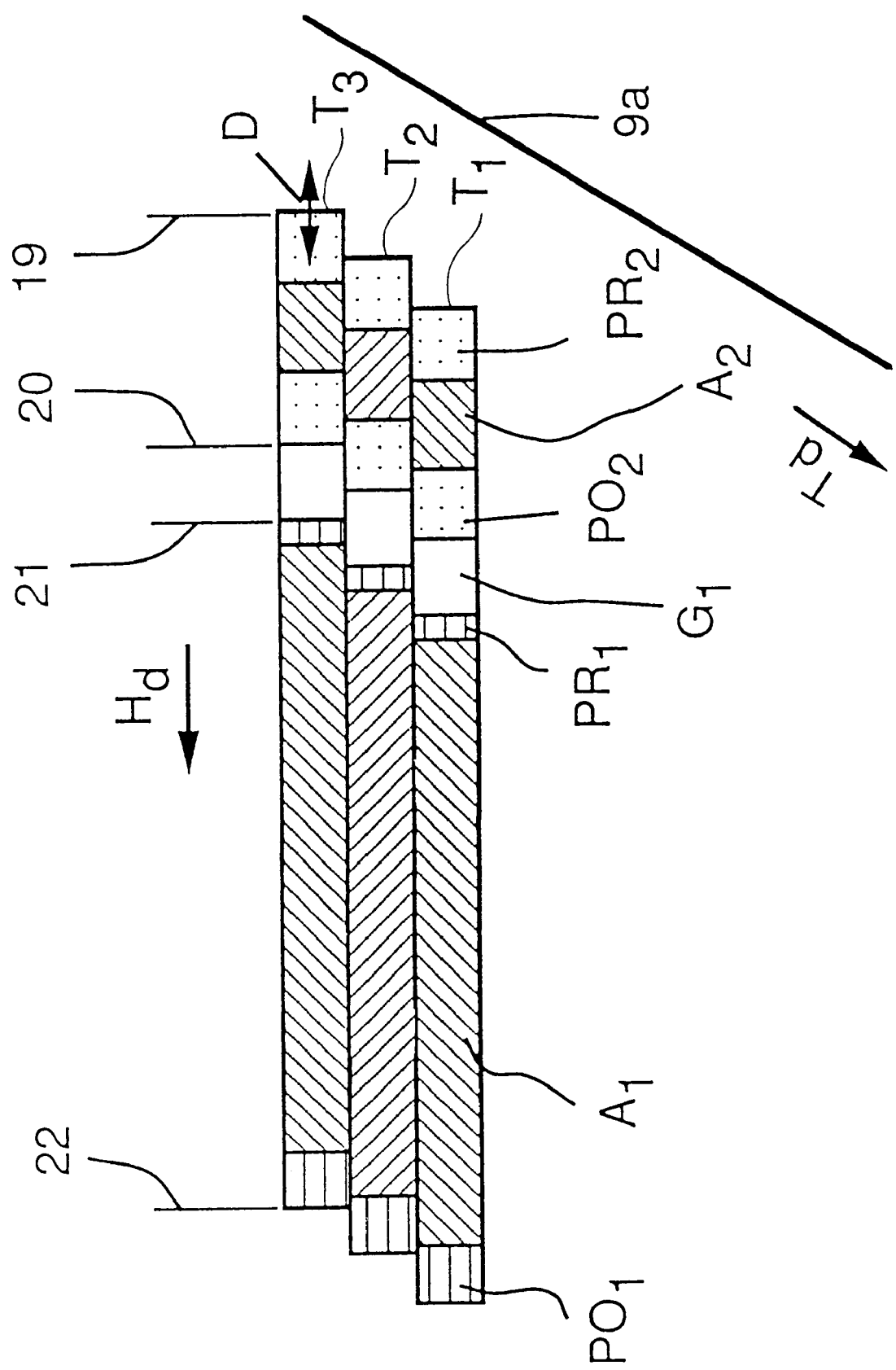
FIG. 9 shows the positional relationship between a recording reference position and the track recording pattern.

In FIG. 9, when, for example, only information of the segment region $A_2$ in the track $T_1$ is to be overwritten, the preamble $PR_1$ and the postamble $PO_1$ are simultaneously overwritten as described below. At this time, the fluctuation of $D=\pm D/2$ will be caused with respect to a start reference position 19 of the preamble $PR_2$ due to the jitter of the rotational drum 8, a reference position error of the start of write for each deck, a writing position error for each tape or for each deck caused by the environmental effect or the like. As a result, the fluctuation of D is also generated for an end position 20. Similarly, when only the segment $A_1$ is to be overwritten, the fluctuation of D is caused with respect to a start reference position 21 and an end reference position 22, respectively.

In a strict sense, the amounts of fluctuation differ from each other for each of the positions 19, 20, 21 and 22 in the track $T_1$ due to the writing position error for each tape and for each deck due to the environmental effect and expansion of the drum and the tape due to a temperature variation. For the following reasons, however, the amount of deviation is regarded as the same for each of the positions in the track $T_1$.

(a) The amount of change with respect to the position in the track $T_1$ is small as compared with the total amount of fluctuation.

(b) The total length of the preamble $PR_2$, the segment $A_2$, the postamble $PO_2$, the gap $G_1$ and the preamble $PR_1$ is small, i.e., less than 4 mm, while a total length of the track $T_1$ is about 100 mm.

Figure 10:
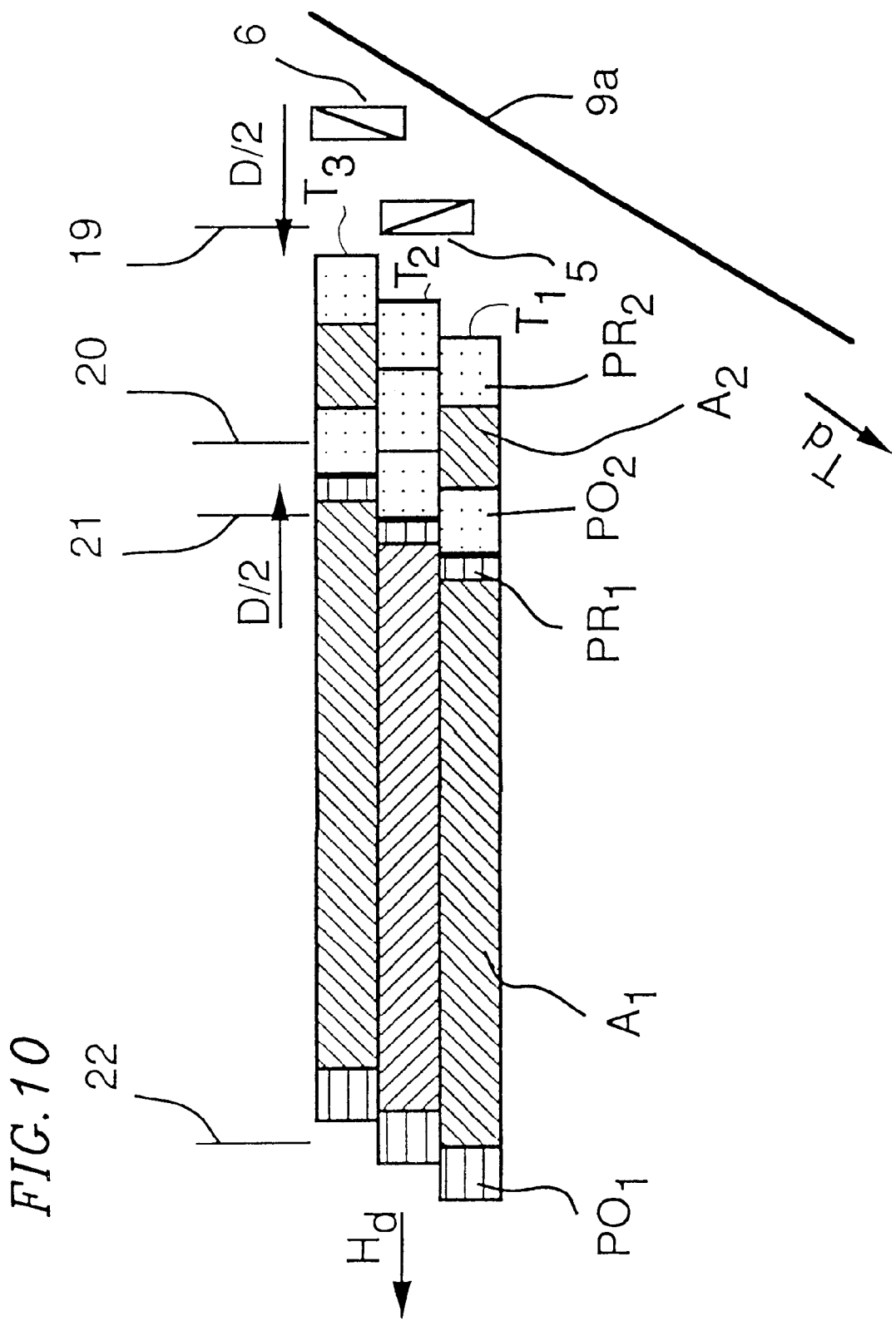
FIG. 10 illustrates the influence of the amount of track fluctuation according to Example 1 of the present invention, in which the data of the segment $A_2$ is overwritten with a head having the same width as that of a track pitch.

FIG. 10 shows the edit of the segments $A_2$ with the deck shifted by D/2 in the direction opposite to the head scanning direction $H_d$ on a magnetic tape on which the preambles $PR_1$, the segments $A_1$ and the postambles $PO_1$ are recorded so as to be shifted by D/2 in the head scanning direction $H_d$. A head width of the magnetic heads 5 and 6 in FIG. 10 are shown as the same as the track pitch $T_P$ for simplicity.

Figure 11:
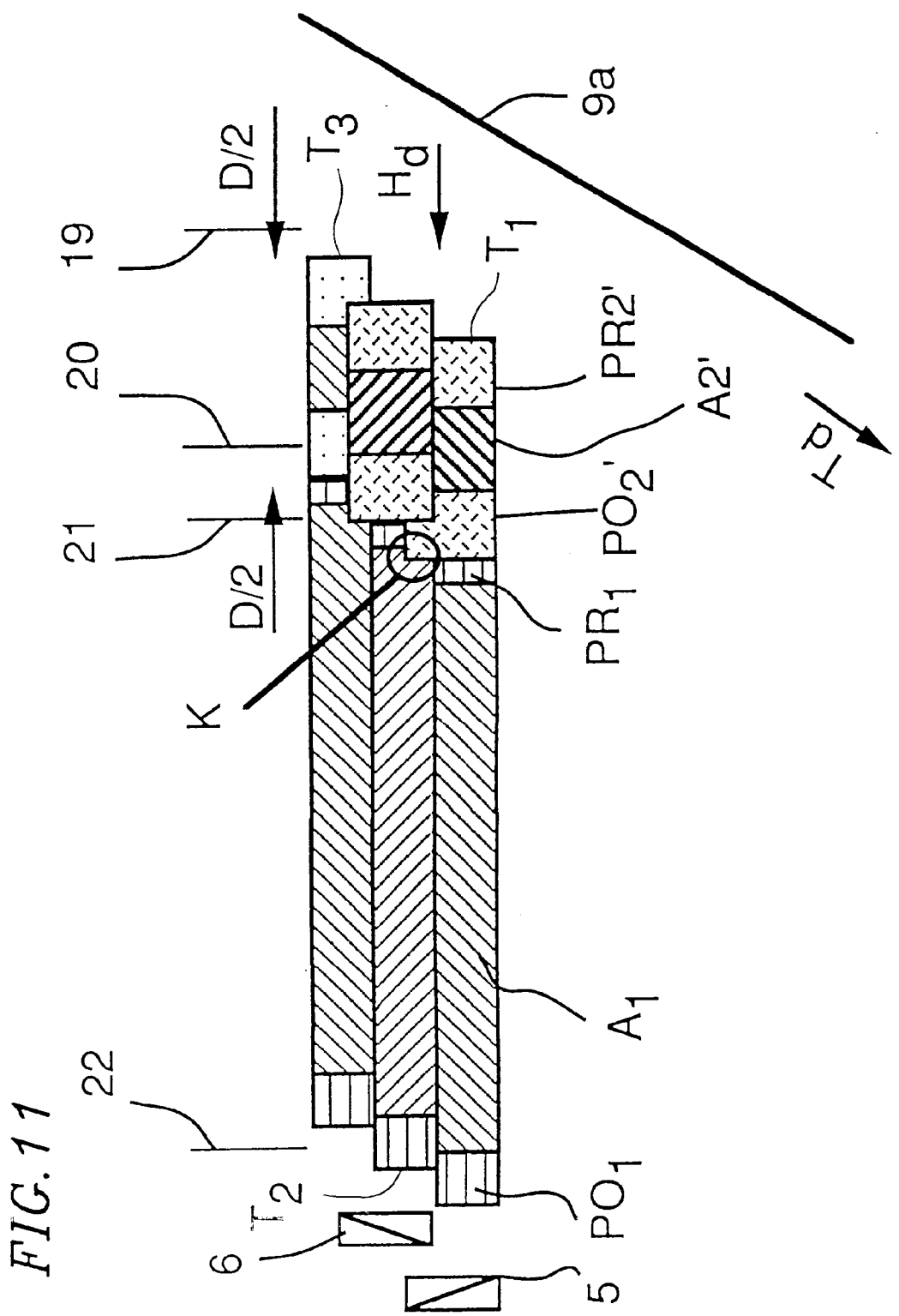
FIG. 11 illustrates the influence of the amount of track fluctuation according to Example 1 of the present invention, in which the data of the segment $A_2$ is overwritten with a wide head.
Figure 12:
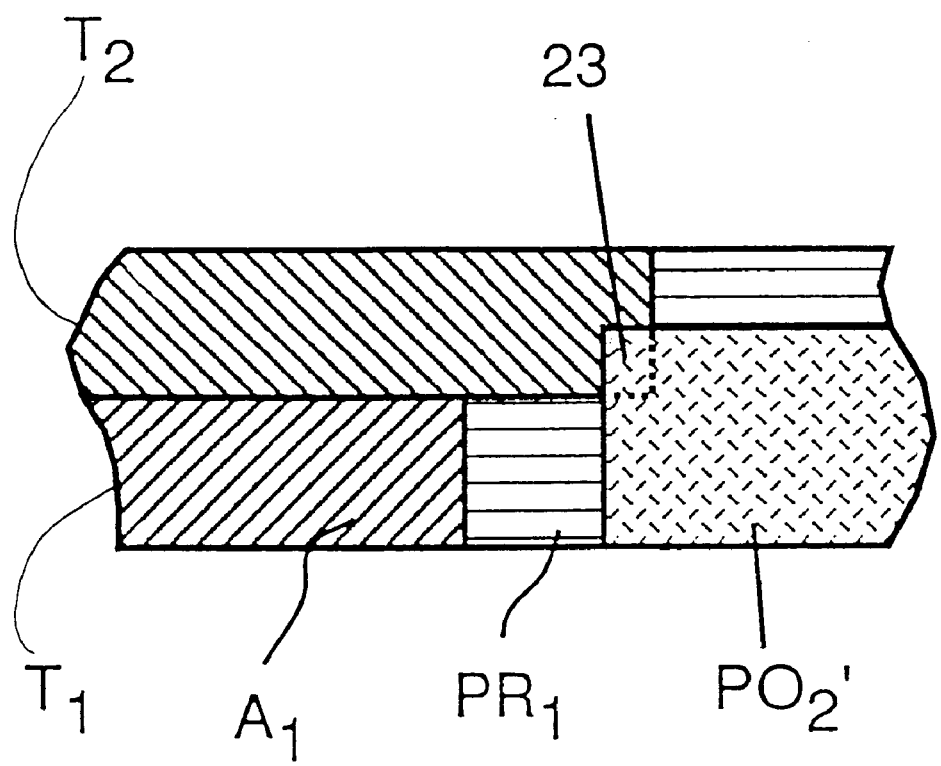
FIG. 12 is a partial enlarged view of a K portion in FIG. 11.

However, since the magnetic heads 5 and 6 use a wide head with respect to the track pitch $T_d$, the actual edit of segment region $A_2$ is as shown in FIG. 11. FIG. 12 shows an enlarged view of a K portion in FIG. 11. In FIGS. 11 and 12, a preamble $PR_2'$, a segment $A_2'$ and a postamble $PO_2'$ represent newly overwritten regions. At this time, an erased portion 23, in which the previous data is undesirably overwritten, is generated in the segment region $A_1$ by the postamble region $PO_2'$, resulting in lack of a reproduction signal in the segment $A_1$ in the track $T_2$. Without using the wide head, the erased portion 23 is also generated by a curved scanning locus (i.e., low linearity) of the magnetic heads 5 and 6 or width tolerance variation of the magnetic heads 5 and 6.

Figure 13:
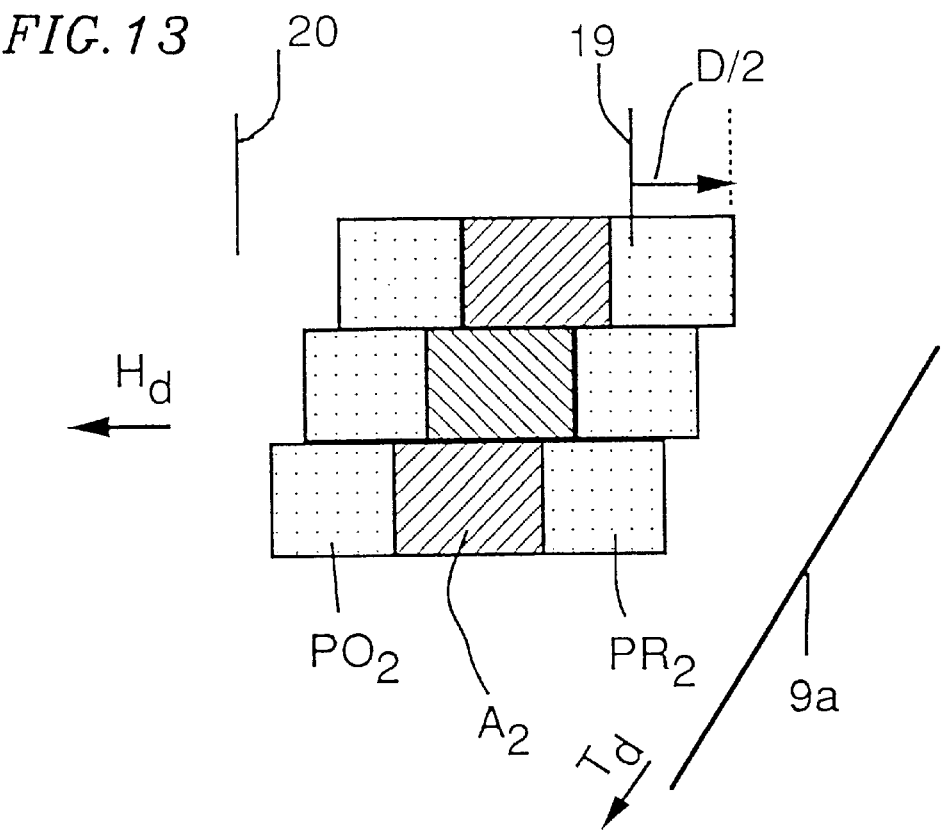
FIG. 13 is a view illustrating the occurrence of unerased data in the segment $A_2$ according to Example 1 of the present invention before overwriting data in the segment $A_2$.
Figure 14:
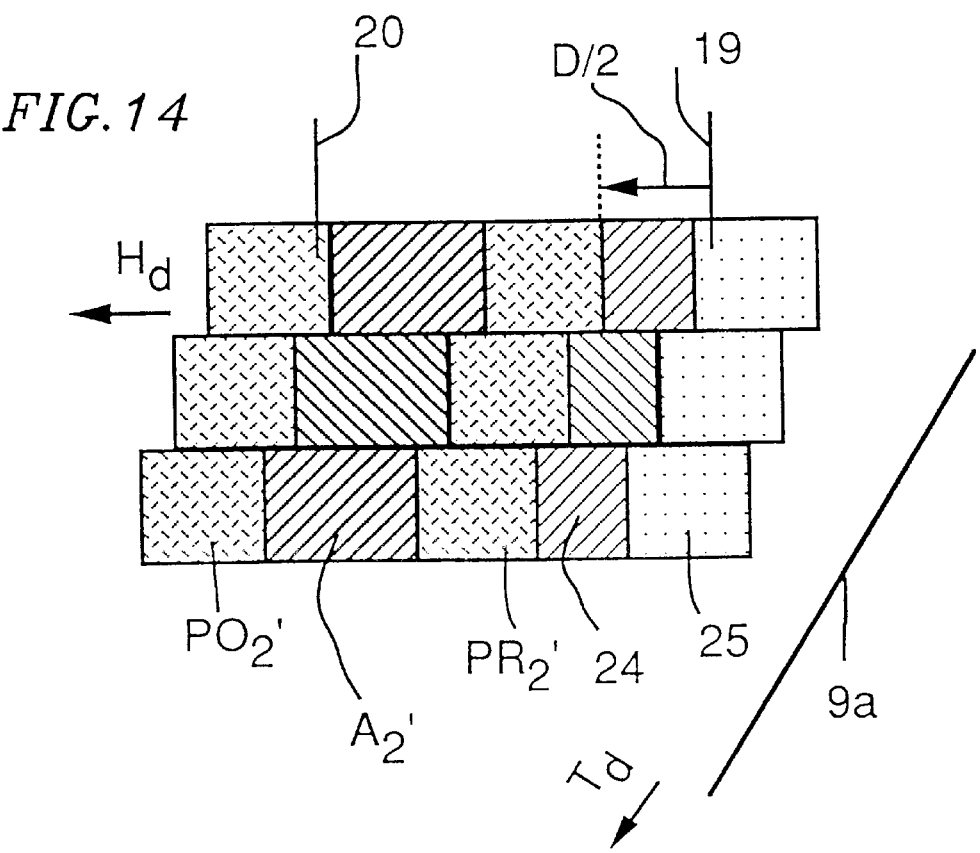
FIG. 14 is a view illustrating the occurrence of unerased data according to Example 1 of the present invention after overwriting data in the segment $A_2$.

FIGS. 13 and 14 are for describing problems occurring when overwriting the segment $A_2$ in which data utilized during high-speed search and the like are recorded.

FIG. 13 shows the case where the preamble $PR_2$ is recorded at the position shifted by D/2 from the reference position 19 in the direction opposite to the scanning direction $H_d$ of magnetic heads 5 and 6. FIG. 14 shows the state where data is overwritten to the magnetic tape shown in FIG. 13 by the deck deviated by D/2 in the scanning direction $H_d$.

In FIG. 14, unerased previous data is shown as an unerased portion 24 in which the segment $A_2$ is previously recorded and an unerased portion 25 in which a preamble $PR_2$ is previously recorded. Since the unerased portion 25 of the preamble $PR_2$ only contains the repetition of a specific pattern or the like, no problem occurs even if the data remaining in the unerased portion 25 is reproduced by the magnetic heads 5 and 6. On the other hand, when $1SB_2$ ($=\frac{1}{4}SB_1$) or more of the unerased portion 24 of the segment $A_2$ is generated, a problem occurs. In normal reproduction, an error signal generated by the unerased portion 24 is certainly written into a memory prior to the correct segment $A_2'$ to reproduce the correct segment $A_2'$. Then, since the error signal is overwritten in the memory, the unerased data in the vicinity of the preambles $PR_1$ and $PR_2$ does not become a problem.

In the segment $A_2$ in which information used during high-speed search (retrieval) is recorded, however, normal operation of the deck cannot be insured when $1SB_2$ or more of the unerased portion 24 occurs since all data is determined as correct data.

Regarding similar unerased data in the segment region $A_1$, since whether a signal in the synchronization signal in the segment $A_1$ in the vicinity of the preamble $PR_1$ added to the segment region $A_1$ is to be reproduced during search or not can be determined by a synchronous pattern, the unerased data is not detected as an error signal during search retrieval.

The optimum recording method of the preamble regions $PR_1$ and $PR_2$ and the postamble regions $PO_1$ and $PO_2$ for precisely reading the re-overwritten data while editing each of the segments $A_1$ and $A_2$ having the amount of fluctuation D as described above in the track will be described below.
<Function of the preambles $PR_1$ and $PR_2$ and necessary amounts thereof>
1. Preamble $PR_1$
(1) A margin for synchronizing the reproducing data using the PLL (phase locked loop) extracting a demodulation clock: a
(2) A margin for preventing an erased portion from being generated in the segment $A_1$ by the heads 5 and 6 due to deviation H between adjacent track positions: b=H (see FIGS. 10, 11 and 12).

In order to satisfy the above two conditions, $PR_1$ should be equal to or larger than:
  a $(=0.2SB_1$ to $0.5SB_1)$ or
  b $(=H=1SB_1)$.
Therefore, the relation $PR_1 \geq 1SB_1$ should be satisfied.
2. Preamble $PR_2$
(1) A margin for synchronizing the reproducing data using a PLL extracting a demodulation clock: a
(2) A margin for preventing the data region from being erased by the heads 5 and 6 due to the deviation H between adjacent track positions: b=H (see FIGS. 10, 11 and 12).
(3) A margin for preventing an error signal from being reproduced by the unerased portion 24 of data during overwriting (re-recording of the segment region $A_2$ alone): c (FIGS. 13 and 14)

In order to satisfy the above three conditions, $PR_2$ should be equal to or larger than:
  a $(=0.2SB_1$ to $0.5SB_1)$ or
  b $(=H=1SB_1)$ or
  c $(=D=3SB_1)$.
Therefore, the relation $PR_2 \geq 3SB_1$ should be satisfied.
<Function of the postambles $PO_1$ and $PO_2$ and necessary amounts thereof>
1. Postamble $PO_1$
(1) A margin for preventing an error signal from being reproduced by the unerased portion 24 of previous data during overwriting (re-recording of the segment region $A_1$ alone): $\geq c-1SB_1$.

The reason why $1SB_1$ is subtracted from a value c equal to the amount D of fluctuation of the track position in the margin for preventing an error signal from being reproduced, is as follows. The unerased data of $1SB_1$ or less generated in the case where a digital signal is reproduced does not become a problem in normal reproduction since it is not actually detected as a signal due to a time period for synchronizing the reproducing data using the PLL.

Based on the margin c being $D=3SB_1$, the relation $PO_1 \geq 2SB_1$ should be satisfied.

2. Postamble $PO_2$
(1) A margin for preventing the data region from being erased by the heads 5 and 6 due to deviation H between adjacent track positions: b=H (see FIGS. 10, 11 and 12).
(2) A margin for preventing an error signal from being reproduced by the unerased portions 24 and 25 of previous data during overwrite: c (FIGS. 13 and 14)

In order to satisfy the above two conditions, $PO_2$ should be equal to or larger than:
  b $(=H=1SB_1)$ or
  c $(=D=3SB_2)$.
Therefore, the relation $PO_2 \geq 3SB_1$ should be satisfied.

The reason why $1SB_2$ is not subtracted from the margin for preventing an error signal from being reproduced by the unerased data determining the preamble $PR_2$ and the postamble $PO_2$ respectively added ahead of and behind the segment region $A_2$, is because a length of the sync block $SB_2$ in the segment region $A_2$ is short, i.e., one-fourth of that of the sync block $SB_1$ of the segment region $A_1$ and a reproducing clock is easily synchronized as described above.

As described above, the segment $A_1$ having a long sync block length used only in normal reproduction, and the segment $A_2$ having a short sync block length used not only in normal reproduction but also in high-speed search retrieval, are included in one track $T_1$. For such a structure, lengths of the preamble $PR_2$ and the postamble $PO_2$ added ahead of and behind the segment $A_2$ having a short length for each sync block are set so as to be longer than those of the preamble $PR_1$ and the postamble $PO_1$ added ahead of and behind the segment $A_1$ having a long length for each sync block.

<Function of the gap region $G_1$ and the amount thereof>
The gap region $G_1$ is a space for reserving the postamble $PO_2$ and the preamble $PR_1$ described above without fail even if the track position fluctuation D occurs. Thus, the relation $G_1 \geq D$ $(=3SB_1)$ should be satisfied.

In this way, when the track position fluctuation amount D is larger than the track position deviation amount H and the amount corresponding to a time period for synchronizing the reproducing data using the PLL, the amount of the preamble $PR_2$, the amount of the postamble $PO_2$, which are added ahead of and behind the segment region $A_2$ used during search, and the amount of the gap region $G_1$ provided between the segment regions $A_1$ and $A_2$ are identical with each other (i.e., $3SB_1$).

In this way, by setting optimum preamble length and postamble length in accordance with the form of data, a recording method enabling the reproduction of a correct signal both in normal reproduction and high-speed search retrieval and capable of reserving the necessary data amount (i.e., reducing the total amount of preamble and postamble) is made possible.

Figure 15:
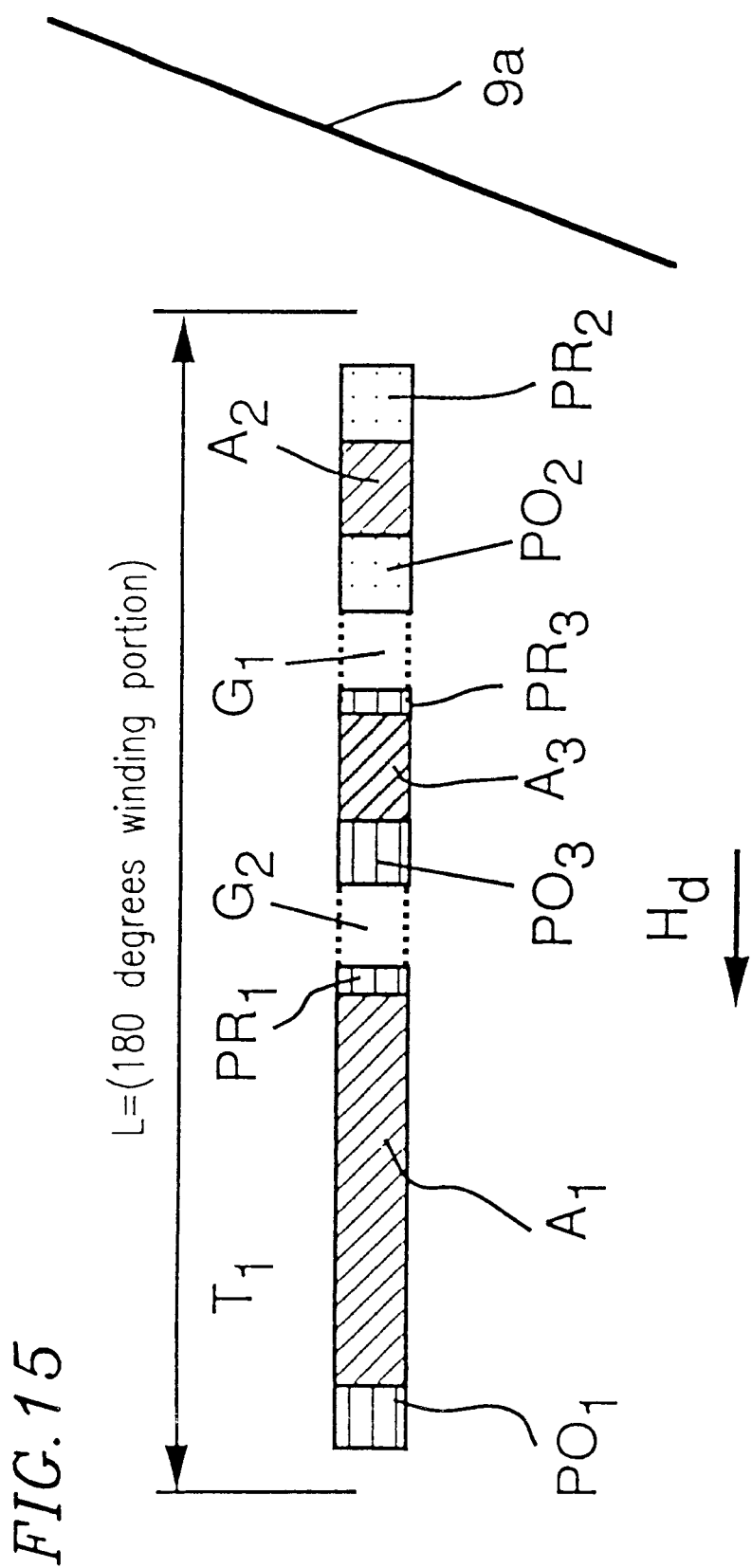
FIG. 15 is a view showing a track recording pattern according to Example 2 of the present invention.

Although one track contains two segments $A_1$ and $A_2$ in one track in this example, the number of segments is not limited thereto. For example, FIG. 15 shows a track recording pattern according to Example 2 of the present invention. FIG. 15 has a segment $A_3$ for after-recording of an audio signal between the segments $A_1$ and $A_2$ as AUX. Also in this case, it is apparent that necessary preamble, post amble and gap can be calculated from the functions (sync block lengths) of the respective segments $A_1$, $A_2$ and $A_3$.

Specifically, in the case where a sync block length constituting AUX is $1SB_1$ as shown in FIG. 15, the amounts of $PR_3$, $PO_3$, and each of the gaps $G_1$, $G_2$ and $G_3$ are set to be $1SB_1$, $2SB_1$ and $3SB_1$, respectively.

Figure 16:
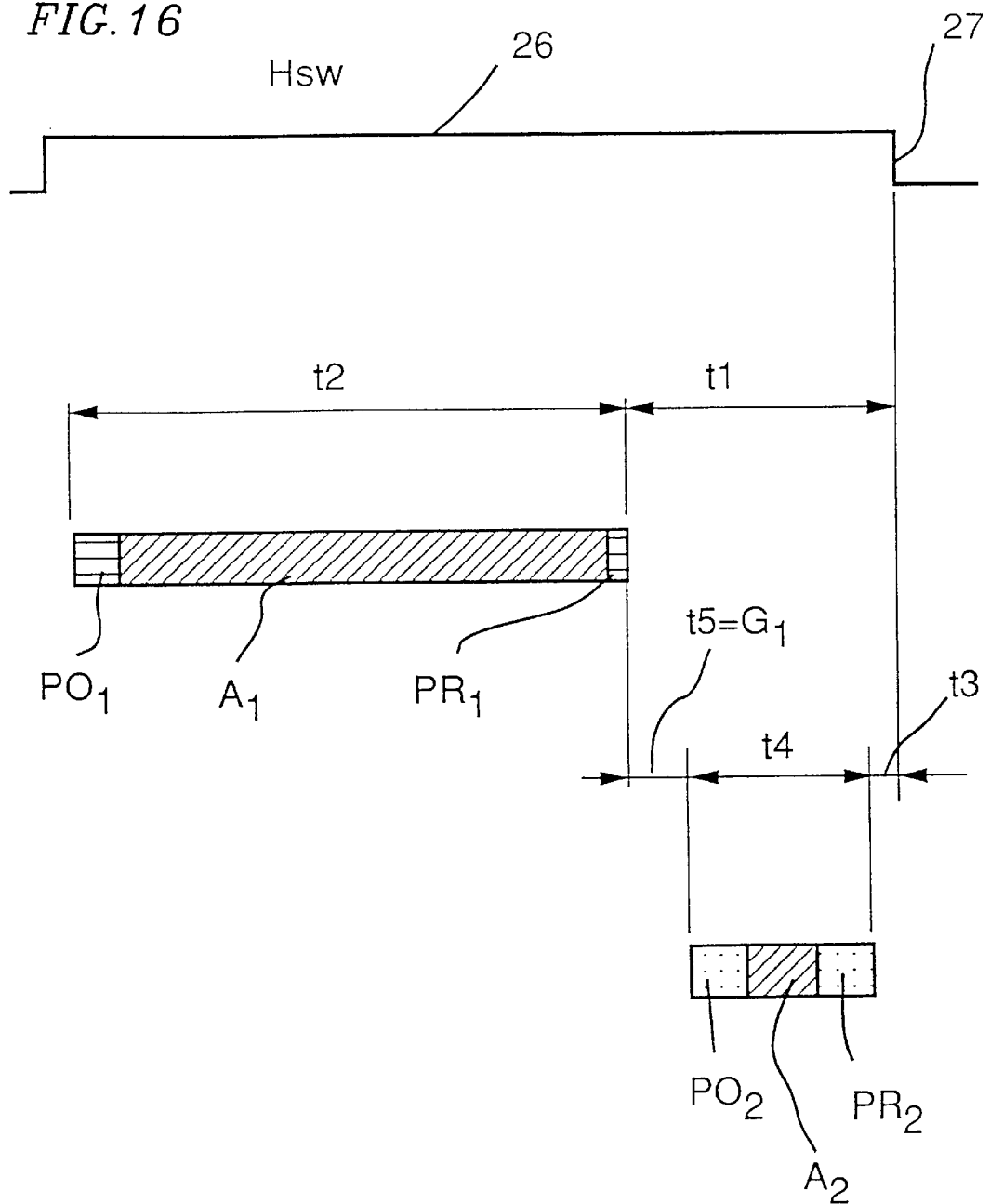
FIG. 16 is a view illustrating an overwriting time period of data according to Example 2 of the present invention.

Next, a method for writing data during a writing operation will be described with reference to FIG. 16 showing the process in which the segment regions $A_1$ and $A_2$ become the closest to each other by the track recording position variation D.

First, in the case where the segment region $A_2$ is to be overwritten, the recording is started when a time period t3 passes from a rising portion 27 of a head switching signal $H_{sw}$ 26, corresponding to the start reference position 19 of the preamble $PR_2$. The signals of the preamble $PR_2$, the segment $A_2$ and the postamble $PO_2$ are recorded over a time period t4.

Next, in the case where the segment region $A_1$ is to be overwritten, the recording is started when a time period t1 passes from the rising portion 27 of the head switching signal $H_{sw}$ 26, corresponding to the start reference position 21 of the preamble $PR_1$. The signals of the preamble $PR_1$, the segment $A_2$ and the postamble $PO_1$ are recorded over a time period t2.

In this way, the time period overwriting signals of the preambles $PR_1$ and $PR_2$, the segments $A_1$ and $A_2$ and the postambles $PO_1$ and $PO_2$, are recorded over the time periods t2 and t4. As a result, even in the case where the recording position fluctuation D occurs at the start reference positions 19 and 21, a necessary region is reserved without causing the preamble $PR_1$ and the postamble $PO_2$, and the segment regions $A_1$ and $A_2$ to interfere each other. More specifically, during edit within the track, a gap time period t5 ($G_1$), in which a signal is not recorded, is required to have a length equal to or longer than the recording position fluctuation amount D.

Furthermore, by the preamble $PR_2$ and the postamble $PO_2$ respectively having lengths equal to or longer than the recording position fluctuation amount D, it is ensured that the previous signal (segment $A_2$) to be erased is prevented from being left unerased.

Therefore, the gap $G_1$ (t5), the preamble $PR_2$ and the postamble $PO_2$ have the same length.

The advantages of setting a length of each of the segment regions $A_1$ and $A_2$ to be a length obtained by multiplying the length of $SB_1$ by an integer number will be described:

1. During normal reproduction, a synchronization signal is detected every time period corresponding to a predetermined interval of the synchronization signal (i.e., a window for detecting a synchronization signal is opened). By making these time intervals uniform, a circuit can be simplified. Specifically, it is not necessary to prepare various window intervals and select a required interval therefrom.

2. A length of track position deviation H and a length of $1SB_1$ in the magnetic recording device according to the present invention are identical with each other, i.e., about 280 $\mu$m. By setting an interval of each segment to be $1SB_1$, the synchronization signals of the adjacent tracks are located at the substantially identical position. Therefore, when the magnetic heads 5 and 6 scan across the tracks $T_1$, $T_2$, $T_3$, $T_4$ . . . etc. during a search, the amount of signals acquired by the magnetic heads 5 and 6 increases. As a result, a stable signal output can be obtained.

Next, the drum unit according to Example 2 will be described.

Figure 17:
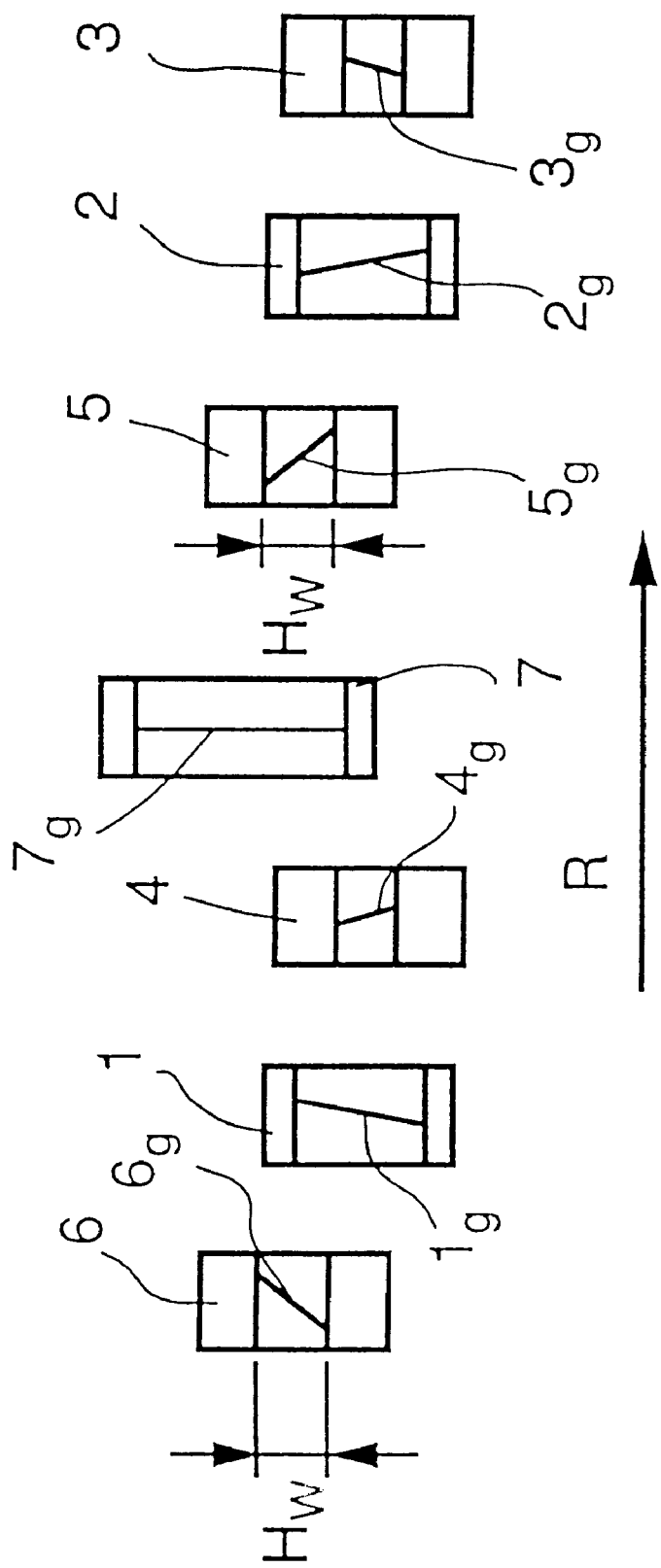
FIG. 17 is a view showing a width of each of the heads mounted onto the rotational drum according to Example 2 of the present invention.

FIG. 17 is a view showing head widths of the magnetic heads 1 through 7 mounted onto the rotational drum 8. As shown in FIG. 17, an effective head width for the SP mode for recording/reproducing analog video signals is about 48 $\mu$m, an effective head width of the heads 3 and 4 for the EP mode is about 28 $\mu$m, a width of a flying erase head 7 is about 115 $\mu$m and an effective head width $H_w$ of the heads 5 and 6 for recording/reproducing FM audio/digital signals is about 31 $\mu$m. In FIG. 17, the reference numerals 1 through 7 with the letter g represent head gaps of the respective magnetic heads 1 through 7.

A track width in analog recording performed with these heads 1 through 6 is 48 $\mu$m (track pitch: 58 $\mu$m) in the SP mode, 19.3 $\mu$m (=track pitch) in an EP mode and 29 $\mu$m (=track pitch) in a digital recording mode.

The magnetic heads 5 and 6 for FM audio/digital signals have azimuth angles of +30 degrees and −30 degrees, respectively, and a gap length of about 0.3 $\mu$m. The shortest recording wavelength which can be digitally recorded is about 0.62 $\mu$m.

Figure 18:
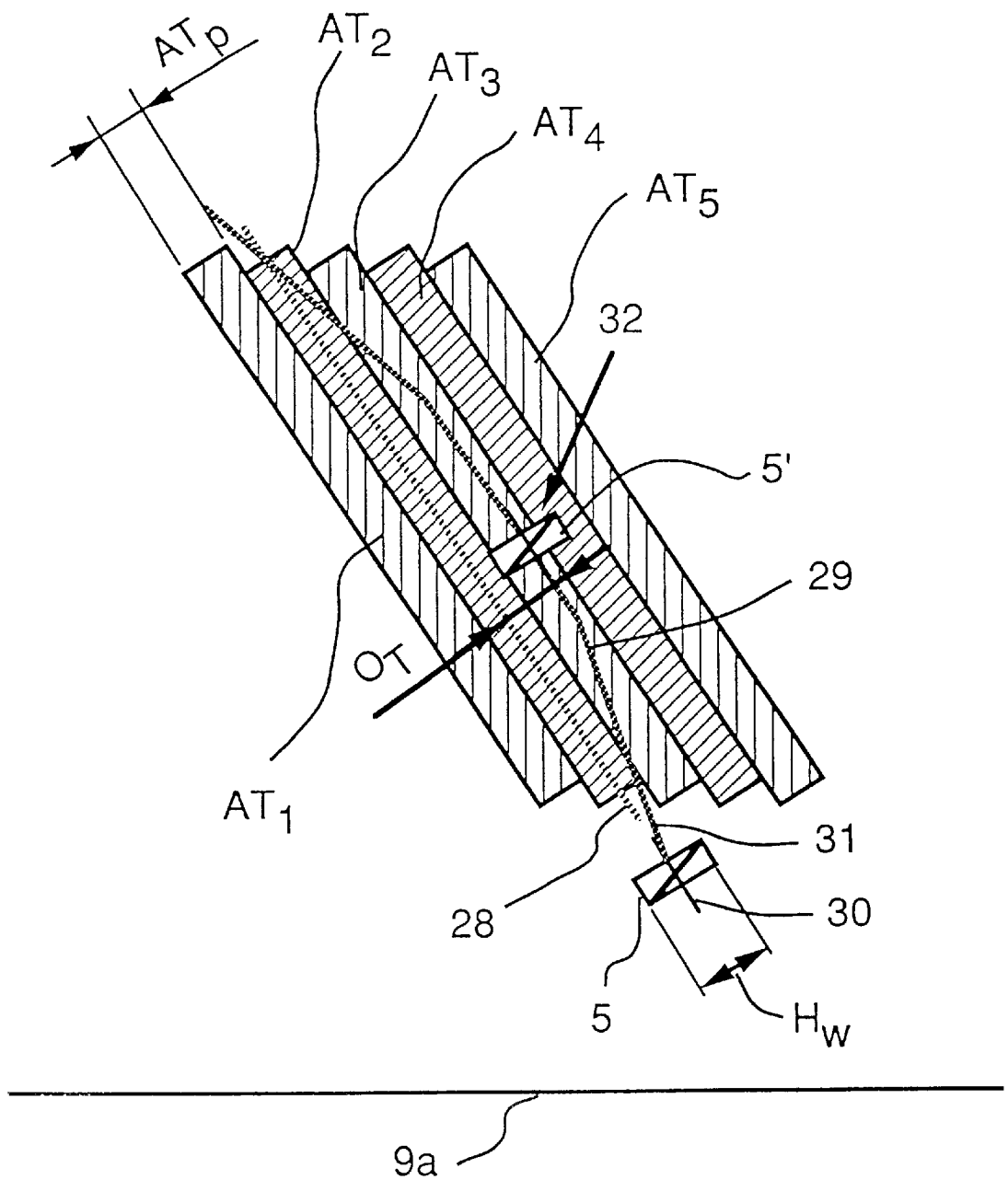
FIG. 18 is a view showing the relationship among a head width, an FM audio recording track width, and a scanning shift between a head and a track.

FIG. 18 shows the relationship among a track width (=a track pitch $AT_P$) and a head width $H_w$ with which analog video signals are recorded in the EP mode.

As described above, the magnetic heads 5 and 6 are used for recording and reproduction of both digital signals and FM audio signals of VHS (multi-layer recording), thereby intending to reduce the cost of devices.

If the magnetic head 5 scanning the track $AT_2$ scans an adjacent track $AT_4$ having the same azimuth angle, a large crosstalk is generated resulting in significant noise in the reproduced audio signal. Therefore, the upper limit of the width $H_w$ of the heads 5 and 6 is determined by the condition for preventing the adjacent track having the same azimuth angle from being scanned for a track width $AT_P$ in the analog EP mode using the smallest width. For example, assuming that the magnetic head 5 scans the position indicated with 5' in FIG. 18, the magnetic head 5' reproduces a leak signal from a crosstalk portion 32. Therefore, a length of the crosstalk portion 32 should be 0 $\mu$m or less.

More specifically, assuming that the amount of off track (the amount of shift) between a head central line 31 of the magnetic heads 5 and 6 of the reproduction deck and a track central line 28 of the track $AT_P$ (19.3 $\mu$m) recorded onto the recording tape 9 is $O_T$, the relationship between the head width $H_w$, the digital recording track width $T_P$ and the analog EP mode recording track width $AT_P$ (19.3 $\mu$m) is determined by the expression: $H_w$23 3$AT_P$−2$O_T$. In FIG. 18, the recording track $AT_P$ is ideally shown as straight and the off track amount $O_T$ is represented in terms of the scanning locus 31 of the heads 5 and 6. In actuality, however, the track $AT_P$ recorded onto the magnetic tape 9 has a curved locus. The off track amount $O_T$ is obtained by adding:

1. the linearity of the track of the recording deck,
2. the amount of change caused by permanent distortion of the tape on which data is recorded due to the environmental effect or the like, and
3. the tracking precision during reproduction. In the EP mode of VHS standard, a track linearity is recommended to be 7 $\mu$m. The amount of change due to permanent distortion of the tape is confirmed to be about 5 $\mu$m in the case where a polyethylene terephthalate (PET)-based magnetic tape is left in an environment of a high temperature and humidity (for example, 60° C. and 80% RH). The tracking precision mentioned last is realized to be about 1 $\mu$m at most.

Thus, the off track amount $O_T$ is obtained to be 13 $\mu$m. The head width $H_w$ of the magnetic heads 5 and 6 for digital/FM audio signals is about 32 (=3×19.3−2×13) $\mu$m or less. Since the head width $H_w$ of the magnetic heads 5 and 6 is normally determined in units of 1 $\mu$m, the head width $H_w$ is set to be 32 $\mu$m or less in this example.

On the other hand, the lower limit of the magnetic heads 5 and 6 is determined in order to realize a sufficient C/N ratio of digital recording and reproduction, and is set to be 27 $\mu$m or more in Example 2. This value is obtained from an MIG head excellent in massproductibity, through experiment of using an existing inexpensive γ iron oxide tape. The experiment will be described in detail.

Figure 19:
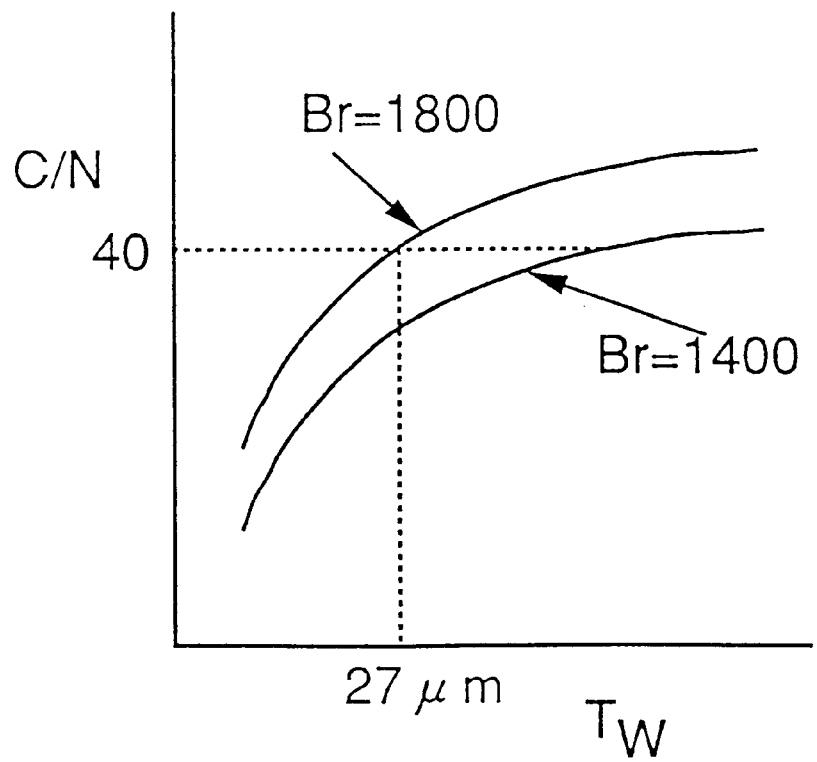
FIG. 19 is a graph showing the relationship between a track width and a C/N ratio according to Example 2 of the present invention.

The tape 9 has characteristics such as a magnetic force resistance $H_c$ of about 950 Oe and a residual magnetic flux density Br of 1800 G. A "BET value" representing the magnetic surface area per a gram is about 50 m²/g. The magnetic heads 5 and 6 use a gap length GL of about 0.3 μm and a gap depth GD of about 20 μm. FIG. 19 shows the experimental result of a C/N ratio, using the magnetic heads 5 and 6 having the above-mentioned characteristics at a maximum frequency $f_{max}$ of 9.5 MHz. An acceptable C/N ratio is determined to be 40 dB or higher using an interleaved NRZI code for encoding a recording signal in view of compatibility between VCRs.

Figure 20:
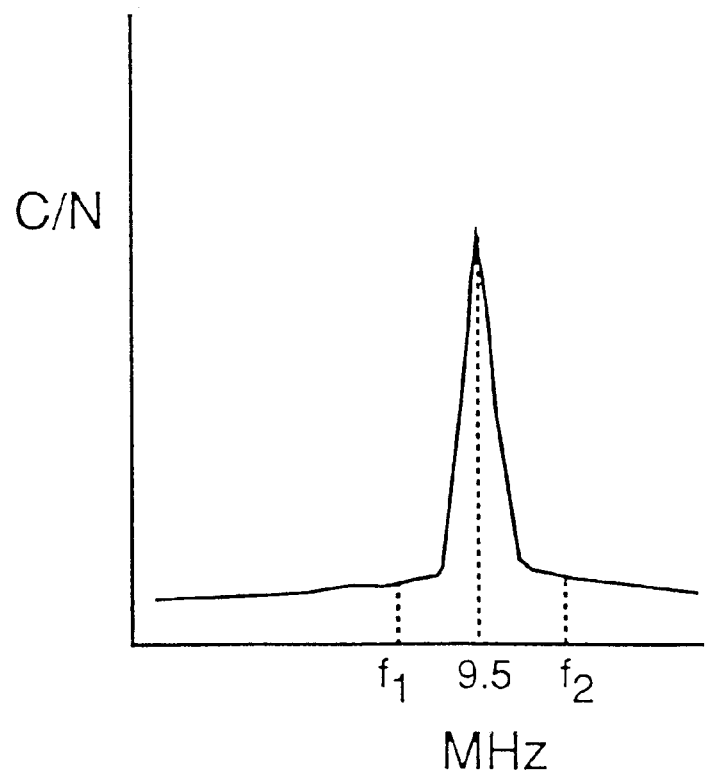
FIG. 20 is a graph showing the result of experimental measurement of a C/N ratio according to Example 2 of the present invention.

The minimum track width is obtained to be 27 μm or more from FIG. 19. The noise in the C/N ratio is calculated within a resolution band width (30 kHz) at frequencies $f_1$ and $f_2$, i.e., 9.5 MHz±1 MHz, as shown in FIG. 20.

A magnetic recording device using the above-mentioned recording method on which the heads described above are mounted will be described below referring to FIG. 21.

FIG. 21 is a block diagram of the recording apparatus according to the present invention. An RF analog input signal is received by an analog buffer 50 and a digital input bit stream signal is received by a digital buffer 51. A video signal of the RF analog input signal is processed by an analog luminance signal processor 33 and an analog chrominance signal processor 34 while an audio signal is processed by an FM audio signal processor 35, in a manner suitable for recording the signal onto a magnetic tape. The analog luminance signal processor 33 includes an LPF (low pass filter) and comb filter 33a, a pre-emphasis circuit 33b and an FM modulator 33c. The analog chrominance signal processor 34 includes a BPF (band pass filter) 34a and a recording chroma processor 34b. The FM audio signal processor 35 includes an LPF 35a, a pre-emphasis circuit 35b and an FM modulator 35c.

On the other hand, the digital input signal of the bit stream is processed by a digital signal processor 36 in a manner suitable for recording the signal onto a magnetic tape. The digital signal processor 36 includes an ECC (Error Correction Code) circuit 36a for adding an error correction code for the signal to be recorded, a formatting circuit 36b for determining a recording pattern of a signal on the magnetic tape or the like and a modulator 36c for performing the scrambled modulation (SI-NRZI) of a digital signal.

When an analog signal is recorded onto the magnetic tape, the video signal consisting of a analog luminance signal and an analog chrominance signal is amplified through a recording amplifier 39 by turning a switch 37 "ON", whereby the signal is recorded onto the magnetic tape by the heads 1 through 4 for video signals. The audio signal from the FM audio signal processor 35 is amplified through a recording amplifier 40 by switching a switch 38 to a terminal 38a side.

In this way, the audio is recorded onto the magnetic tape by the heads 5 and 6 for FM audio/digital signals.

When a digital signal is to be recorded onto the magnetic tape, the switch 38 is switched to a terminal 38b side and the switch 37 is turned "OFF". A signal from the digital signal processor 36 is amplified through the recording amplifier 40, whereby the signal is recorded onto the magnetic tape by the heads 5 and 6 for FM audio/digital signals.

Although the magnetic heads 5 and 6 are capable of both recording and reproducing FM audio/digital signals in Examples 1 and 2, it is apparent that the above-mentioned concept can be applied to a reproduction-only head or a record-only head.

Moreover, although the drum of Examples 1 and 2 includes the rotational drum 8 and the fixed drum 14, the structure of the drum is not limited thereto. For example, the drum can have fixed upper and lower drums corresponding to the rotational drum and fixed drum of the present invention and a rotatable intermediate disk on which heads are mounted. Alternatively, the lower drum corresponding to the fixed drum of the present invention can be movable.

The present invention will be applicable to a recording apparatus which does not have reproduction function and to a recording/reproduction apparatus which has both recording function and reproduction function as will be appreciated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording apparatus comprising:

an FM audio signal processor for generating an FM audio signal;

a digital signal processor for generating a digital signal;

a switching section for selectively outputting one of the FM audio signal and the digital signal;

a rotational drum; and a magnetic head mounted on the rotational drum for recording one of the FM audio signal and the digital signal output from the switching section in a recording track of a recording tape.

2. A recording apparatus according to claim 1, wherein a head width $H_w$ of the magnetic head satisfies a relation 27 μm≦$H_w$≦32 μm.

3. A recording apparatus according to claim 1, further comprising: and a fixed drum for rotatably supporting the rotatable drum around a rotational axis.

* * * * *